(12) United States Patent
Leigh et al.

(10) Patent No.: US 10,903,905 B2
(45) Date of Patent: Jan. 26, 2021

(54) OPTICAL TRANSCEIVER MODULES

(71) Applicant: HEWLETT PACKARD ENTERPRISE DEVELOPMENT LP, Houston, TX (US)

(72) Inventors: Kevin Leigh, Houston, TX (US); John Norton, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/330,213

(22) PCT Filed: Sep. 12, 2016

(86) PCT No.: PCT/US2016/051349
§ 371 (c)(1),
(2) Date: Mar. 4, 2019

(87) PCT Pub. No.: WO2018/048449
PCT Pub. Date: Mar. 15, 2018

(65) Prior Publication Data
US 2019/0229809 A1 Jul. 25, 2019

(51) Int. Cl.
*H04J 14/02* (2006.01)
*H04B 10/40* (2013.01)

(52) U.S. Cl.
CPC ........... *H04B 10/40* (2013.01); *H04J 14/02* (2013.01)

(58) Field of Classification Search
CPC ................................. H04B 10/40; H04J 14/02
USPC .......................................................... 398/79
See application file for complete search history.

(56) References Cited

U.S. PATENT DOCUMENTS

| 9,660,730 B1* | 5/2017 | Rope ................. H04B 10/54 |
| 2005/0025486 A1 | 2/2005 | Zhong et al. |
| 2010/0021166 A1* | 1/2010 | Way ................ H04J 14/02 398/79 |
| 2012/0093518 A1 | 4/2012 | Tosetti et al. |
| 2014/0056592 A1* | 2/2014 | McColloch ........... H04B 10/40 398/135 |
| 2015/0281129 A1* | 10/2015 | Kono ................. H04L 25/14 370/359 |
| 2016/0192044 A1* | 6/2016 | Raza .................. G02B 6/3885 398/49 |

FOREIGN PATENT DOCUMENTS

| WO | WO-2015126470 A2 | 8/2015 | |
| WO | WO 2016/048373 A1 * | 3/2016 | ............... G02B 6/36 |

(Continued)

OTHER PUBLICATIONS

Alice Gui ("Double Density QSFP (QSFP-DD) Is Coming", Apr. 8, 2016, pp. 1-2. (Year: 2016).*

(Continued)

*Primary Examiner* — Mohammad R Sedighian
(74) *Attorney, Agent, or Firm* — Hewlett Packard Enterprise Patent Department

(57) ABSTRACT

One example of an optical transceiver module includes a receptacle including at least one receptacle bay supporting at least 1-lane for optical transmit and receive signals. The at least one receptacle bay is to connect to any one of a 1-connector bay single-density optical cable and a 1-connector bay double-density optical cable.

8 Claims, 18 Drawing Sheets

(56) References Cited

FOREIGN PATENT DOCUMENTS

WO  WO-2016048373 A1  3/2016
WO  WO-2017111947 A1  6/2017

OTHER PUBLICATIONS

Gui, A., "Double Density QSFP (QSFP-DD) Is Coming," Apr. 8, 2016, pp. 1-2, https://www.linkedin.com/pulse/double-density-qsfp-qsfp-dd-coming-alice-gui.
International Search Report and Written Opinion received for PCT Patent Application No. PCT/US2016/051349, dated May 24, 2017, 10 pages.

* cited by examiner

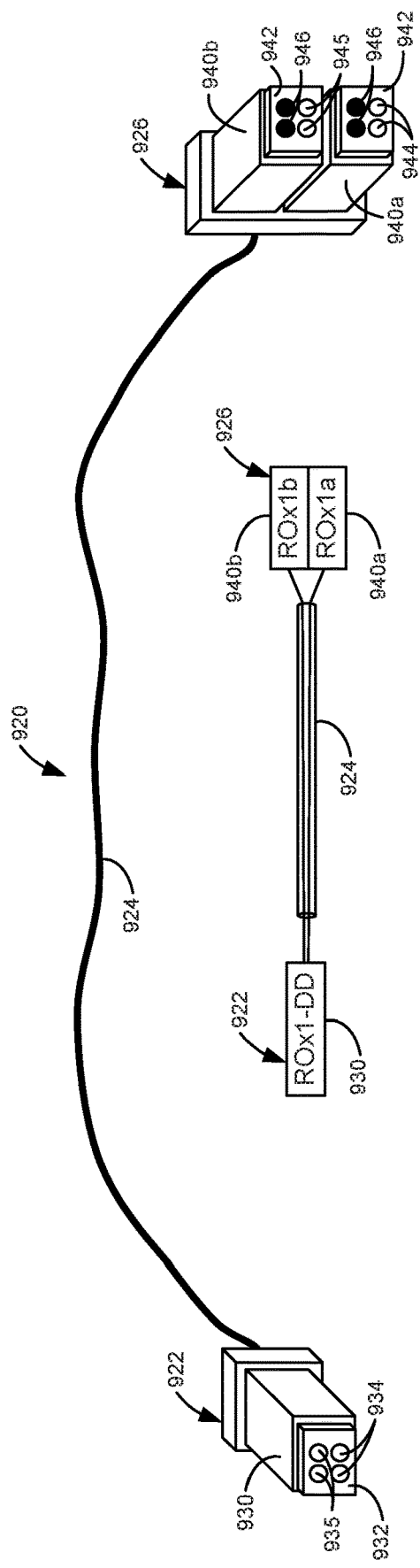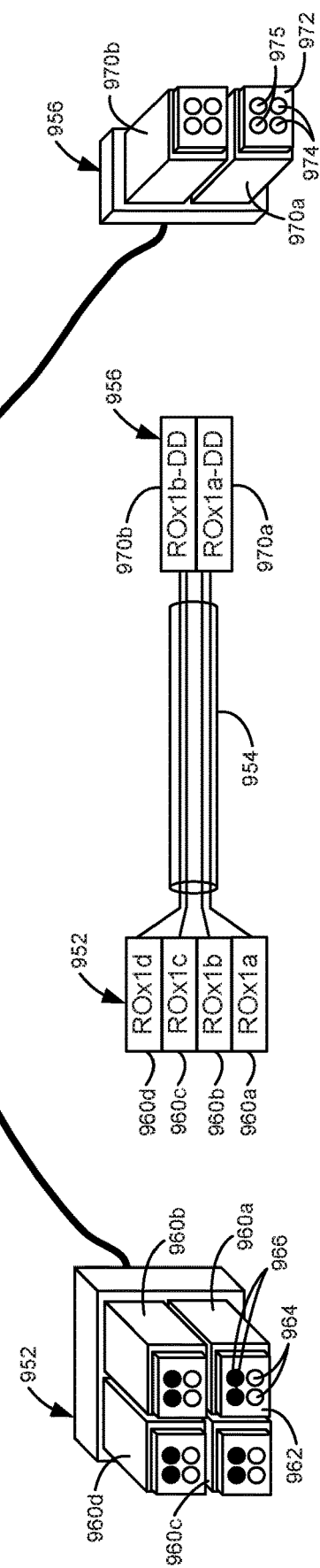
Fig. 11
Fig. 12

| Modules/Connectors | SFP/ROx1 [1λ] | SFP-DD/ROx2 [1λ] | SFP-DD/ROx1-DD [1λ] | QSFP/ROx4 [1λ] | QSFP/ROx1 [4λ, CWDM] | QSFP-DD8L/ROx4-DD [1λ, 8-lane mode] | QSFP-DD4L/ROx4-DD [1λ, 4-lane mode] | QSFP-DD/ROx2 [4λ, CWDM] | HLP/(3)ROx2 [4λ, CWDM] | QSFP-2XO [1λ, full-rate mode] | QSFP-2XO [1λ, half-rate mode] |
|---|---|---|---|---|---|---|---|---|---|---|---|
| SFP/ROx1 [1λ] | (1) ROx1 | (2) ROx1* | (1) ROx1† | (4) ROx1* | N/A | (4) ROx1† | (4) ROx1* | N/A | N/A | N/A | (4) ROx1* |
| SFP-DD/ROx2 [1λ] | | (2) ROx1* (1) ROx2 | (1) ROx2/ROx1-DD | (2) ROx2* | N/A | (4) ROx2/ROx1-DD* | (2) ROx2* | N/A | N/A | N/A | (2) ROx2* |
| SFP-DD/ROx1-DD [1λ] | | | (1) ROx1-DD | (2) ROx1-DD/ROx2* (4) ROx1†* | N/A | (4) ROx1-DD* | (2) ROx1-DD/ROx2* (4) ROx1†* | N/A | N/A | N/A | (2) ROx1-DD/ROx2* |
| QSFP/ROx4 [1λ] | | | | (1) ROx4 (2) ROx2* (4) ROx1* | N/A | (2) ROx4/ROx2-DD* | (1) ROx4 (2) ROx2* (4) ROx1* | N/A | N/A | N/A | (1) ROx4 (2) ROx2* (4) ROx1* |
| QSFP/ROx1 [4λ, CWDM] | | | | | (1) ROx1 | N/A | N/A | (2) ROx1* | (6) ROx1* | N/A | N/A |
| QSFP-DD8L/ROx4-DD [1λ, 8-lane mode] | | | | | | (1) ROx4-DD (2) ROx2-DD* (4) ROx1-DD* (1) ROx4† (2) ROx2† (4) ROx1† | (1) ROx4-DDˆ (2) ROx2-DDˆˆ (4) ROx1-DDˆˆ (1) ROx4† (2) ROx2† (4) ROx1† | N/A | N/A | N/A | (2) ROx4/ROx2-DD* |
| QSFP-DD4L/ROx4-DD [1λ, 4-lane mode] | | | | | | | (1) ROx4 (2) ROx2* (4) ROx1* (1) ROx4-DD (2) ROx2-DD† (4) ROx1-DD† | N/A | N/A | N/A | (1) ROx4 (2) ROx2* (4) ROx1* (1) ROx4-DD† (2) ROx2-DD† (4) ROx1-DD† |
| QSFP-DD/ROx2 [4λ, CWDM] | | | | | | | | (1) ROx2 (2) ROx1* | (3) ROx2* (6) ROx1* | N/A | N/A |
| HLP/(3)ROx2 [4λ, CWDM] | | | | | | | | | (1) ROx6 (3) ROx2* (6) ROx1* | N/A | N/A |
| QSFP-2XO [1λ, full-rate mode] | | | | | | | | | | (1) ROx4-DD (2) ROx2-DD* (4) ROx1-DD* | N/A |
| QSFP-2XO [1λ, half-rate mode] | | | | | | | | | | | (1) ROx4 (2) ROx2* (4) ROx1* (1) ROx4-DD† (2) ROx2-DD† (4) ROx1-DD† |

* CONNECTION TO SEPARATE MODULES  ˆ DIFFERENT LANE ORDERS FOR HALF OF THE LANES  † HALF OF THE LANES ARE USED

Fig. 16

OPTICAL TRANSCEIVER MODULES

BACKGROUND

Pluggable optical transceiver modules may be used to connect network systems, such as switches and server network cards. Pluggable optical transceiver modules, such as 1-lane small form-factor pluggable (SFP) and 4-lane quad small form-factor pluggable (QSFP), which are also known as multi-source agreement (MSA) modules, include an optical receptacle to accept an optical cable. Several variants exist for 1-lane SFP and 4-lane QSFP based on the data rate.

BRIEF DESCRIPTION OF THE DRAWINGS

FIG. 11 illustrates one example of a 1-connector bay 2-lane double-density to 2-connector bay 2-lane single-density optical cable.

FIG. 12 illustrates one example of a 4-connector bay 4-lane single-density to 2-connector bay 4-lane double-density optical cable.

FIG. 16 is a table illustrating one example of an interoperability matrix between transceiver modules/connectors and optical cables.

DETAILED DESCRIPTION

Figure 1A:
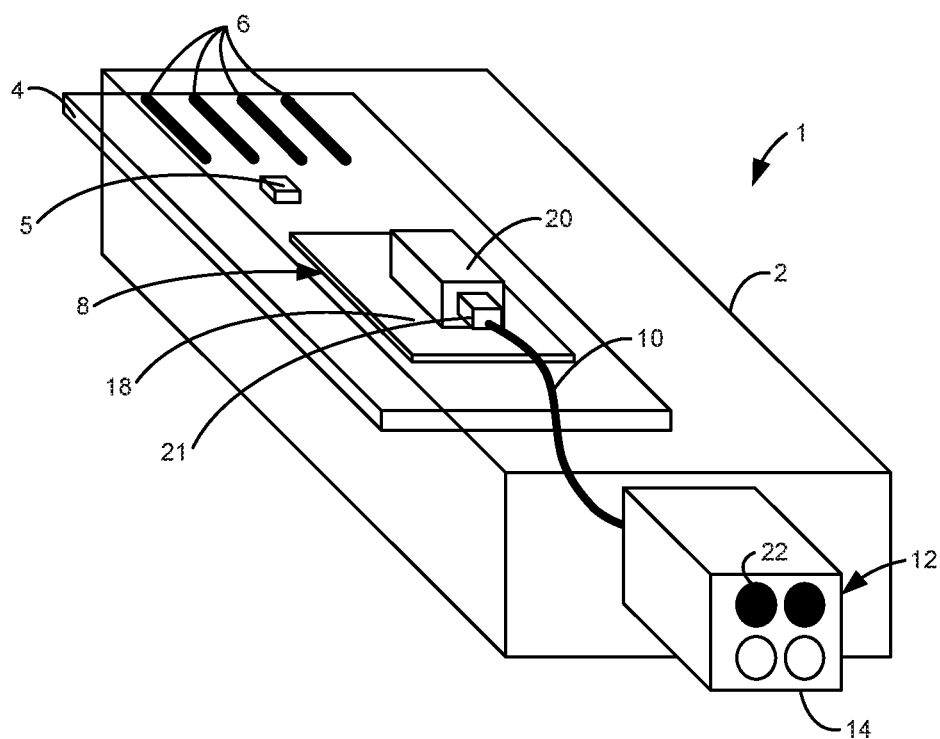
FIGS. 1A and 1B illustrate one example of a small-form factor pluggable (SFP) transceiver module.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

As used herein, the term "ROx" refers to a modular optical cable connector. "ROx1" refers to a single connector supporting two optical fibers, "ROx2" refers to two integrated ROx1 connectors supporting four optical fibers, and "ROx4" refers to four integrated ROx1 connectors supporting eight optical fibers. "ROx1-DD" refers to a single double-density connector supporting four optical fibers, "ROx2-DD" refers to two integrated ROx1-DD connectors supporting eight optical fibers, and "ROx4-DD" refers to four integrated ROx1-DD connectors supporting 16 optical fibers.

A lane includes a transmit signal and a receive signal for network communications. Accordingly, an optical lane (OL) includes a first optical signal path for a transmit signal and a second optical signal path for a receive signal. One optical fiber may be used to transport one optical signal having one wavelength (e.g., a transmit or a receive signal of one lane). Alternatively, one optical fiber may be used to transport at least two optical signals (e.g., four optical signals) each having a different corresponding wavelength. An electrical lane (EL) includes a first electrical signal line for a transmit signal and a second electrical signal line for a receive signal.

Variants for SFP and QSFP are emerging for double the lane density (i.e., double-density (DD)). These variants are SFP-DD, which supports 2-lanes, and QSFP-DD, which supports 8-lanes. The data rates for SFP-DD and QSFP-DD may also vary. Multi-lane connections with higher bandwidth per lane and higher lane count QSFP transceiver modules are convenient for switch-to-switch connections and certain high-performance computing systems, but 1-lane is sufficient for the majority of server/storage systems.

Typically, breakout cables and/or breakout boxes are used to fan-out a multi-lane cable from a QSFP transceiver module to single-lane cables to connect to corresponding SFP transceiver modules installed in server/storage systems, but these breakout cables and breakout boxes are bulky, expensive, and the additional connection points may increase installation time and connection problems. In addition, when one wavelength per lane is used, multi-fiber push-on (MPO) connectors used for QSFP transceiver modules do not have enough optical fibers to support QSFP-DD transceiver modules, and Lucent Connector duplex (LC-Duplex) connectors used for SFP transceiver modules do not include enough optical fibers to support SFP-DD transceiver modules.

Accordingly, this disclosure describes modular optical cable connectors (ROx) integrated in SFP, SFP-DD, QSFP, QSFP-DD, and other optical transceiver modules that enable independent optical cables of different lane counts to be connected without using breakout cables and/or breakout boxes. Accordingly, a SPF-DD transceiver module may support 4-fiber connectivity and a QSFP-DD transceiver module may support 16-fiber connectivity. In addition, a hot-pluggable 24-lane optical transceiver module, also known as a hot-pluggable line pod (HLP), may support six independent ROx optical cables where each ROx1 cable may be connected to separate devices without breakout cables and/or breakout boxes. The disclosure describes interoperability among transceiver modules from optical signal lane alignment perspectives. ROx connectors and cables described herein are agnostic to additional interoperability requirements such as multi-mode versus single-mode optical signals, optical signal wavelength(s), etc., defined by respective industry standard specifications.

Figure 1B:
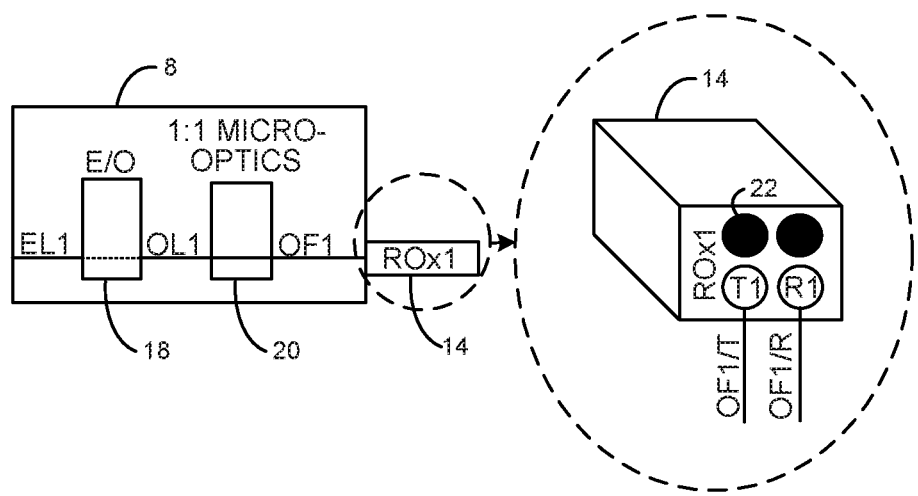

FIGS. 1A and 1B illustrate one example of a SFP transceiver module 1. SFP transceiver module 1 includes a housing 2, a printed circuit board (PCB) 4, a management controller 5, an optical transceiver 8, optical fiber jumpers 10, and a receptacle 12. In one example, receptacle 12 is an integral part of housing 2. In another example, receptacle 12 may be installed within housing 2. Receptacle 12 includes one ROx1 optical connector, i.e., one receptacle bay (ROx1) 14. Receptacle bay 14 may include an optical ferrule (not shown) supporting optical fibers, which will be described with reference to FIGS. 11 and 12. The optical ferrule may be physical contact type or expanded beam type.

PCB 4 includes an electrical connector 6, such as a card edge connector, which is electrically coupled to optical transceiver 8 to pass electrical signals between optical transceiver 8 and a system in which SFP transceiver module 1 is installed. Optical transceiver 8 is optically coupled to receptacle bay 14 via an optical fiber coupler 21 and optical fiber jumpers 10. Optical fiber coupler 21 may include total internal reflection (TIR) paths to change the direction of the corresponding optical signals between micro-optics and optical fibers. Electrical connector 6 is electrically coupled to management controller 5 to pass management signals between management controller 5 and a system in which SFP transceiver module 1 is installed. Management controller 5 controls the operation of SPF transceiver module 1.

SFP transceiver module 1 includes 1-lane. As illustrated in FIG. 1B, receptacle bay 14 supports one lane through first transmit (OF1/T) and receive (OF1/R) optical fibers, which may be optically coupled to first transmit (T1) and receive (R1) optical fiber positions of receptacle bay 14, respectively. The black optical fiber positions, one of which is indicated for example at 22, are unused in this example. The unused optical fiber positions enable receptacle bay 14 to be connected to either a 1-lane (2-fiber) single-density optical cable or a 2-lane (4-fiber) double-density optical cable. If receptacle bay 14 is connected to a 2-lane double-density optical cable, one of the two lanes of the 2-lane double-density optical cable is unused.

Optical transceiver 8 includes an electro-optical (E/O) transceiver chip 18 and 1:1 micro-optics 20 (e.g., optical lens). The 1:1 micro-optics 20 and optical fiber coupler 21 may be implemented as one component. E/O transceiver chip 18 converts electrical signals received on a first electrical lane (EL1) to provide optical signals on a first optical lane (OL1), and converts optical signals received on OL1 to provide electrical signals on EL1. EL1 is electrically coupled to electrical connector 6. The 1:1 micro-optics 20 optically couples OL1 to OF1. OF1 may be optically coupled to OF1/T, OF1/R via receptacle bay 14.

Figure 2A:
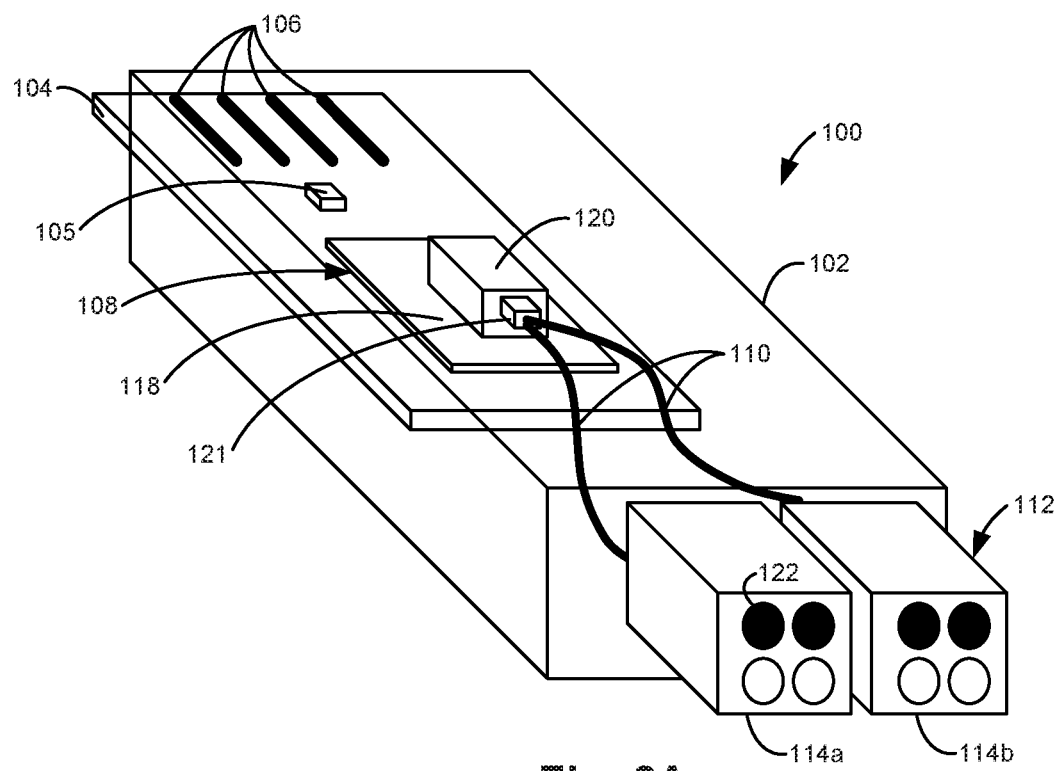
FIGS. 2A and 2B illustrate one example of a double-density small-form factor pluggable (SFP-DD) transceiver module.
Figure 2B:
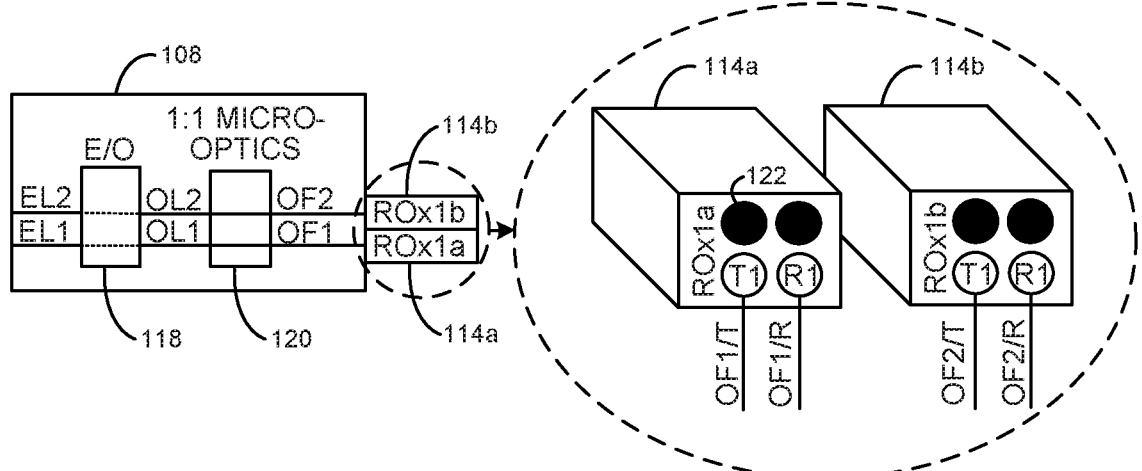

FIGS. 2A and 2B illustrate one example of a SFP-DD transceiver module 100. SFP-DD transceiver module 100 includes a housing 102, a PCB 104, a management controller 105, an optical transceiver 108, optical fiber jumpers 110, and a receptacle 112. In one example, receptacle 112 is an integral part of housing 102. In another example, receptacle 112 may be installed within housing 102. Receptacle 112 includes two ROx1 optical connectors including a first receptacle bay (ROx1a) 114a and a second receptacle bay (ROx1b) 114b.

PCB 104 includes an electrical connector 106, such as a card edge connector, which is electrically coupled to optical transceiver 108 to pass electrical signals between optical transceiver 108 and a system in which SFP-DD transceiver module 100 is installed. Optical transceiver 108 is optically coupled to each receptacle bay 114a and 114b via an optical fiber coupler 121 and optical fiber jumpers 110. In another example, optical transceiver 108 may be directly optically coupled to each receptacle bay 114a and 114b without using optical fiber jumpers 110 by using a transmit optical sub-assembly (TOSA) and a receive optical sub-assembly (ROSA) (not shown). Electrical connector 106 is electrically coupled to management controller 105 to pass management signals between management controller 105 and a system in which SFP-DD transceiver module 100 is installed. Management controller 105 controls the operation of SPF-DD transceiver module 100.

SFP-DD transceiver module 100 includes 2-lanes. As illustrated in FIG. 2B, first receptacle bay 114a supports a first lane through first transmit (OF1/T) and receive (OF1/R) optical fibers, which may be optically coupled to first transmit (T1) and receive (R1) optical fiber positions of first receptacle bay 114a, respectively. Second receptacle bay 114b supports a second lane through second transmit (OF2/T) and receive (OF2/R) optical fibers, which may be optically coupled to first transmit (T1) and receive (R1) optical fiber positions of second receptacle bay 114b, respectively. The black optical fiber positions, one of which is indicated for example at 122, are unused in this example. The unused optical fiber positions enable first receptacle bay 114a and/or second receptacle bay 114b to be connected to either a 1-lane (2-fiber) single-density optical cable or a 2-lane (4-fiber) double-density optical cable. If first receptacle bay 114a and/or second receptacle bay 114b is connected to a 2-lane double-density optical cable, one of the two lanes of the 2-lane double-density optical cable is unused.

Optical transceiver 108 includes an E/O transceiver chip 118 and 1:1 micro-optics 120. The 1:1 micro-optics 120 and optical fiber coupler 121 may be implemented as one component. E/O transceiver chip 118 converts electrical signals received on a first electrical lane (EL1) and a second electrical lane (EL2) to provide optical signals on a first optical lane (OL1) and a second optical lane (OL2), and converts optical signals received on OL1 and OL2 to provide electrical signals on EL1 and EL2, respectively. EL1 and EL2 are electrically coupled to electrical connector 106. The 1:1 micro-optics 120 optically couples OL1 and OL2 to OF1 and OF2, respectively. OF1 and OF2 may be optically coupled to OF1/T, OF1/R and OF2/T, OF2/R via receptacle bays 114a and 114b, respectively.

Figure 2C:
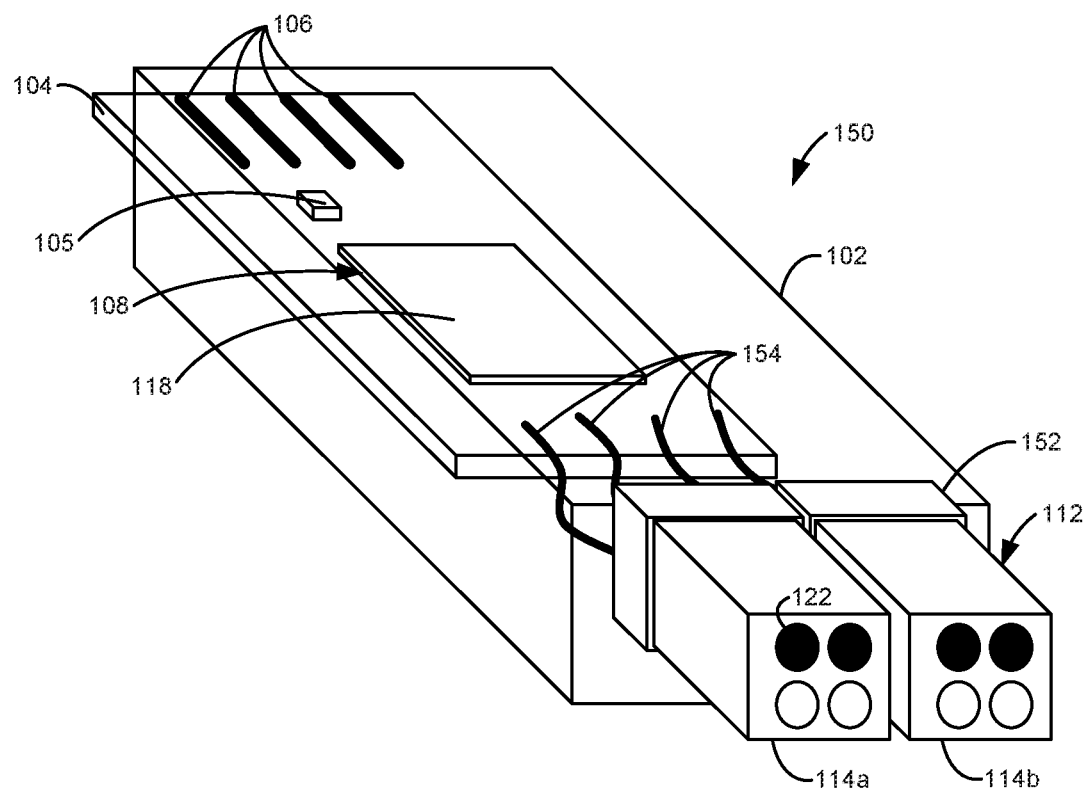
FIG. 2C illustrates another example of a SFP-DD transceiver module.

FIG. 2C illustrates another example of a SFP-DD transceiver module 150. SFP-DD transceiver module 150 is similar to SFP-DD transceiver module 100 previously described and illustrated with reference to FIGS. 2A and 2B, except that SFP-DD transceiver module 150 includes a TOSA and a ROSA 152 and electrical interface 154 in place of 1:1 micro-optics 120, optical fiber coupler 121, and optical fiber jumpers 110. In this example, TOSA and ROSA 152 are integrated with receptacle 112 and electrical interface 154 directly optically couples each receptacle bay 114a and 114b to E/O transceiver chip 118 without using optical fiber jumpers.

Figure 3A:
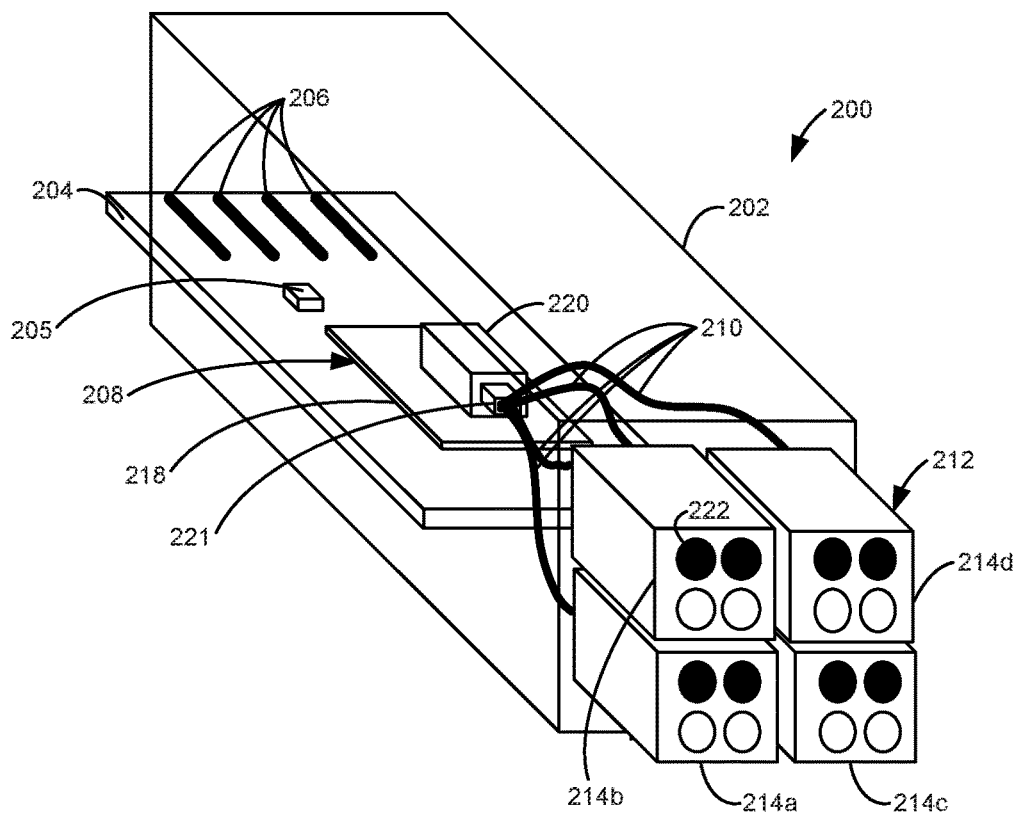
FIGS. 3A and 3B illustrate one example of a quad small-form factor pluggable (QSFP) transceiver module.
Figure 3B:
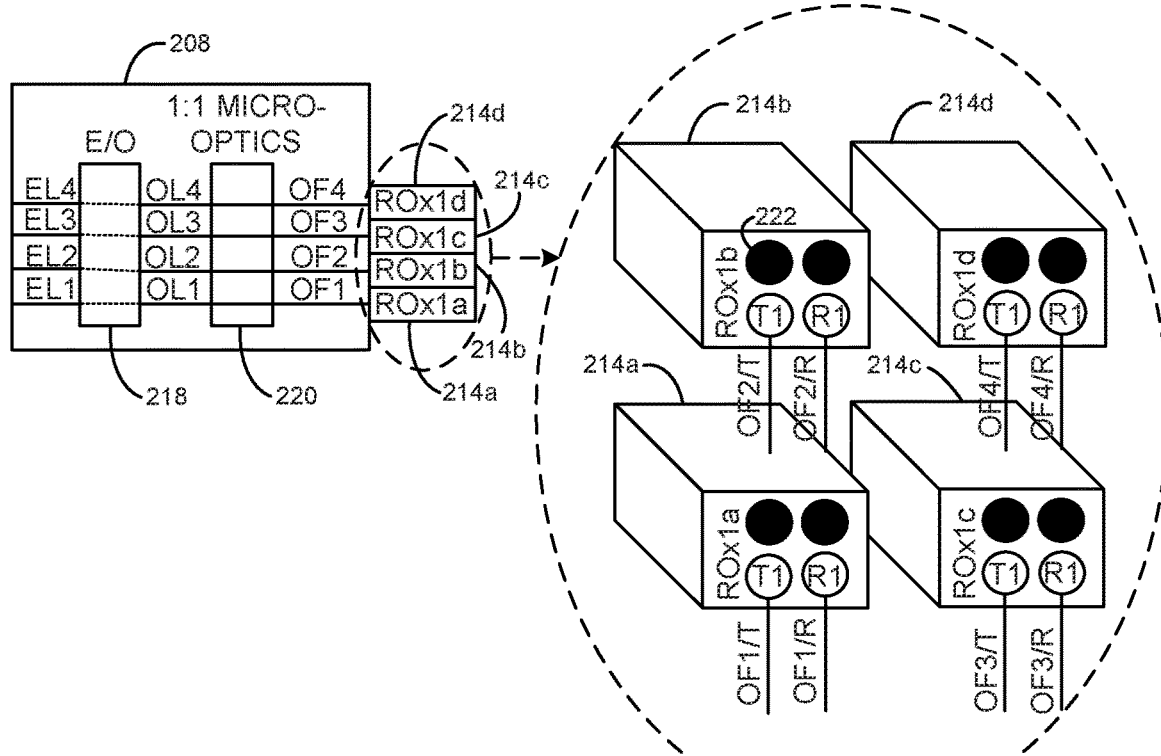

FIGS. 3A and 3B illustrate one example of a QSFP transceiver module 200. QSFP transceiver module 200 includes a housing 202, a PCB 204, a management controller 205, an optical transceiver 208, optical fiber jumpers 210, and a receptacle 212. In one example, receptacle 212 is an integral part of housing 202. In another example, receptacle 212 may be installed within housing 202. Receptacle 212 includes a ROx4 optical connector including a first receptacle bay (ROx1a) 214a, a second receptacle bay (ROx1b) 214b, a third receptacle bay (ROx1c) 214c, and a fourth receptacle bay (ROx1d) 214d.

PCB 204 includes an electrical connector 206, such as a card edge connector, which is electrically coupled to optical transceiver 208 to pass electrical signals between optical transceiver 208 and a system in which QSFP transceiver module 200 is installed. Optical transceiver 208 is optically coupled to each receptacle bay 214a, 214b, 214c, and 214d via an optical fiber coupler 221 and optical fiber jumpers 210. Electrical connector 206 is electrically coupled to management controller 205 to pass management signals between management controller 205 and a system in which QSFP transceiver module 200 is installed. Management controller 205 controls the operation of QSPF transceiver module 200.

QSFP transceiver module 200 includes 4-lanes. As illustrated in FIG. 3B, first receptacle bay 214a supports a first lane through first transmit (OF1/T) and receive (OF1/R) optical fibers, which may be optically coupled to first transmit (T1) and receive (R1) optical fiber positions of first receptacle bay 214a, respectively. Second receptacle bay 214b supports a second lane through second transmit (OF2/T) and receive (OF2/R) optical fibers, which may be optically coupled to first transmit (T1) and receive (R1) optical fiber positions of second receptacle bay 214b, respectively. Third receptacle bay 214c supports a third lane through third transmit (OF3/T) and receive (OF3/R) optical fibers, which may be optically coupled to first transmit (T1) and receive (R1) optical fiber positions of third receptacle bay 214c, respectively. Fourth receptacle bay 214d supports a fourth lane through fourth transmit (OF4/T) and receive (OF4/R) optical fibers, which may be optically coupled to first transmit (T1) and receive (R1) optical fiber positions of fourth receptacle bay 214d, respectively.

The black optical fiber positions, one of which is indicated for example at 222, are unused in this example. The unused optical fiber positions enable each of the first receptacle bay 214a, second receptacle bay 214b, third receptacle bay 214c, and fourth receptacle bay 214d to be connected to either a 1-lane single-density optical cable or a 2-lane double-density optical cable. If each of the first receptacle bay 214a, second receptacle bay 214b, third receptacle bay 214c, and fourth receptacle bay 214d is connected to a 2-lane double-density optical cable, one of the two lanes of the 2-lane double-density optical cable is unused.

Optical transceiver 208 includes an E/O transceiver chip 218 and 1:1 micro-optics 220. E/O transceiver chip 218 converts electrical signals received on a first electrical lane (EL1), a second electrical lane (EL2), a third electrical lane (EL3), and a fourth electrical lane (EL4) to provide optical signals on a first optical lane (OL1), a second optical lane (OL2), a third optical lane (OL3), and a fourth optical lane (OL4), and converts optical signals received on OL1, OL2, OL3, and OL4 to provide electrical signals on EL1, EL2, EL3, and EL4, respectively. EL1, EL2, EL3, and EL4 are electrically coupled to electrical connector 206. The 1:1 micro-optics 220 optically couples OL1, OL2, OL3, and OL4 to OF1, OF2, OF3, and OF4 respectively. OF1, OF2, OF3, and OF4 may be optically coupled to OF1/T, OF1/R; OF2/T, OF2/R; OF3/T, OF3/R; and OF4/T, OF4/R via receptacle bays 214a, 214b, 214c, and 214d, respectively.

FIGS. 4A-4F illustrate example optical cables for connecting to optical transceiver modules. While the connector of one end of each optical cable is illustrated in FIGS. 4A-4F, the connector of the other end of each optical cable is similar to the illustrated connector, with transmit optical fibers on one end arranged to be receive optical fibers on the other end.

Figure 4A:
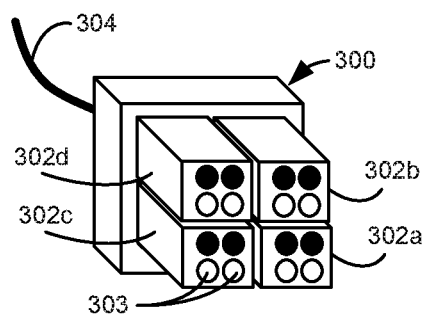
FIGS. 4A-4F illustrate example optical cables for connecting to optical transceiver modules.

FIG. 4A illustrates a 4-connector bay 4-lane signal-density (ROx4) optical cable 300. Accordingly, optical cable 300 is a multi-connector bay optical cable. Optical cable 300 includes four connector bays 302a, 302b, 302c, and 302d for connecting to four receptacle bays, such as receptacle bays 214a, 214b, 214c, and 214d, respectively, of QSFP transceiver module 200 previously described and illustrated with reference to FIGS. 3A and 3B. In this example, each connector bay 302a, 302b, 302c, and 302d supports 1-lane and includes two optical fibers. Each connector bay 302a, 302b, 302c, and 302d includes two optical fiber positions, indicated for example at 303, which are aligned with the T1 and R1 optical fiber positions of a corresponding receptacle bay when optical cable 300 is coupled to a transceiver module receptacle. For ROx4 optical cable 300, eight optical fibers for 4-lanes are included within bundled optical fibers 304.

Figure 4B:
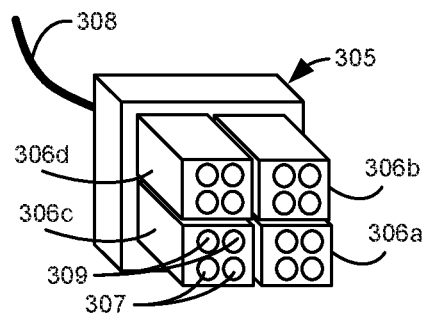

FIG. 4B illustrates a 4-connector bay 8-lane double-density (ROx4-DD) optical cable 305. Accordingly, optical cable 305 is a multi-connector bay optical cable. Optical cable 305 includes four connector bays 306a, 306b, 306c, and 306d for connecting to four receptacle bays of a transceiver module. In this example, each connector bay 306a, 306b, 306c, and 306d supports 2-lanes and includes four optical fibers. Each connector bay 306a, 306b, 306c, and 306d includes a first two optical fiber positions, indicated for example at 307, and a second two optical fiber positions, indicated at 309, which are aligned with the T1 and R1 optical fiber positions and the T2 and R2 optical fiber positions (which will be described with reference to FIG. 6D), respectively, of a corresponding receptacle bay when optical cable 305 is coupled to a transceiver module receptacle. For ROx4-DD optical cable 305, 16 optical fibers for 8-lanes are included within bundled optical fibers 308.

Figure 4C:
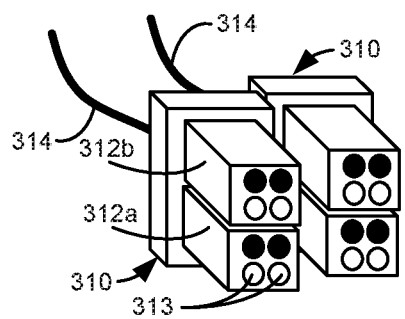

FIG. 4C illustrates two 2-connector bay 2-lane single-density (ROx2) optical cables 310. Accordingly, optical cable 310 is a multi-connector bay optical cable. Each optical cable 310 includes two connector bays 312a and 312b for connecting to two receptacle bays, such as receptacle bays 214a and 214b or receptacle bays 214c and 214d of QSFP transceiver module 200 previously described and illustrated with reference to FIGS. 3A and 3B. In this example, each connector bay 312a and 312b supports 1-lane and includes two optical fibers. Each connector bay 312a and 312b includes two optical fiber positions, indicated for example at 313, which are aligned with the T1 and R1 optical fiber positions of a corresponding receptacle bay when optical cable 310 is coupled to a transceiver module receptacle. For each ROx2 optical cable 310, four optical fibers for 2-lanes are included within bundled optical fibers 314.

Figure 4D:
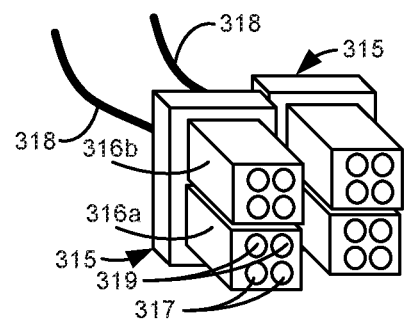

FIG. 4D illustrates two 2-connector bay 4-lane double-density (ROx2-DD) optical cables 315. Accordingly, optical cable 315 is a multi-connector bay optical cable. Each optical cable 315 includes two connector bays 316a and 316b for connecting to two receptacle bays, such as receptacle bays 214a and 214b or receptacle bays 214c and 214d of QSFP transceiver module 200 previously described and illustrated with reference to FIGS. 3A and 3B. In this example, each connector bay 316a and 316b supports 2-lanes and includes four optical fibers. Each connector bay 316a and 316b includes a first two optical fiber positions, indicated for example at 317, and a second two optical fiber positions, indicated for example at 319, which are aligned with the T1 and R1 optical fiber positions and the T2 and R2 optical fiber positions, respectively, of a corresponding receptacle bay when optical cable 315 is coupled to a transceiver module receptacle. For each ROx2-DD optical cable 315, eight optical fibers for 4-lanes are included within bundled optical fibers 318.

Figure 4E:
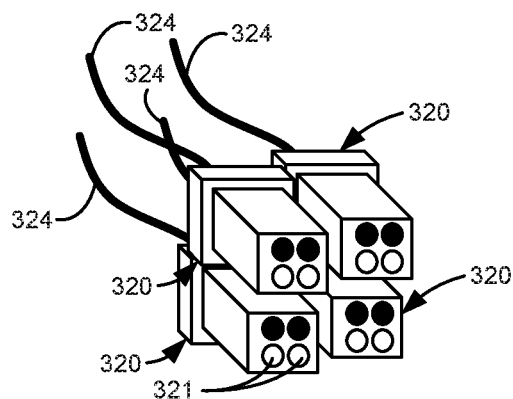

FIG. 4E illustrates four 1-connector bay 1-lane single-density (ROx1) optical cables 320. Each optical cable 320 includes one connector bay for connecting to one receptacle bay, such as receptacle bay 214a, 214b, 214c, or 214d of QSFP transceiver module 200 previously described and illustrated with reference to FIGS. 3A and 3B or receptacle bay 114a or 114b of SFP-DD transceiver module 100 previously described and illustrated with reference to FIGS. 2A and 2B. In this example, each optical cable 320 supports 1-lane and includes two optical fibers. The connector bay includes two optical fiber positions, indicated for example at 321, which are aligned with the T1 and R1 optical fiber positions of a corresponding receptacle bay when optical cable 320 is coupled to a transceiver module receptacle. For each ROx1 optical cable 320, two optical fibers for 1-lane are included within bundled optical fibers 324.

Figure 4F:
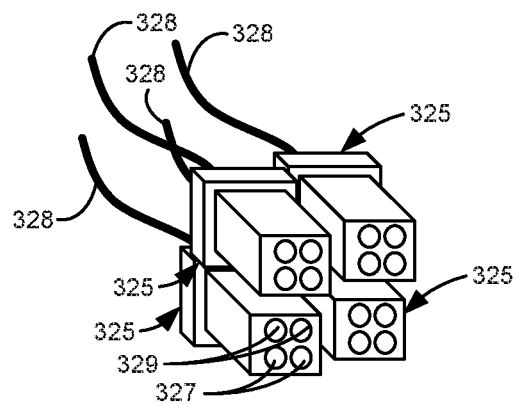

FIG. 4F illustrates four 1-connector bay 2-lane double-density (ROx1-DD) optical cables 325. Each optical cable 325 includes one connector bay for connecting to one receptacle bay, such as receptacle bay 214a, 214b, 214c, or 214d of QSFP transceiver module 200 previously described and illustrated with reference to FIGS. 3A and 3B or receptacle bay 114a or 114b of SFP-DD transceiver module 100 previously described and illustrated with reference to FIGS. 2A and 2B. In this example, each optical cable 325 supports 2-lanes and includes four optical fibers. The connector bay includes a first two optical fiber positions, indicated for example at 327, and a second two optical fiber positions, indicated for example at 329, which are aligned with the T1 and R1 optical fiber positions and the T2 and R2 optical fiber positions, respectively, of a corresponding receptacle bay when optical cable 325 is coupled to a transceiver module receptacle. For each ROx1-DD optical cable 325, four optical fibers for 2-lanes are included within bundled optical fibers 328. Accordingly, by selecting the appropriate optical cables 300, 305, 310, 315, 320, or 325 for the application, breakout cables and/or breakout boxes may be avoided.

Figure 5A:
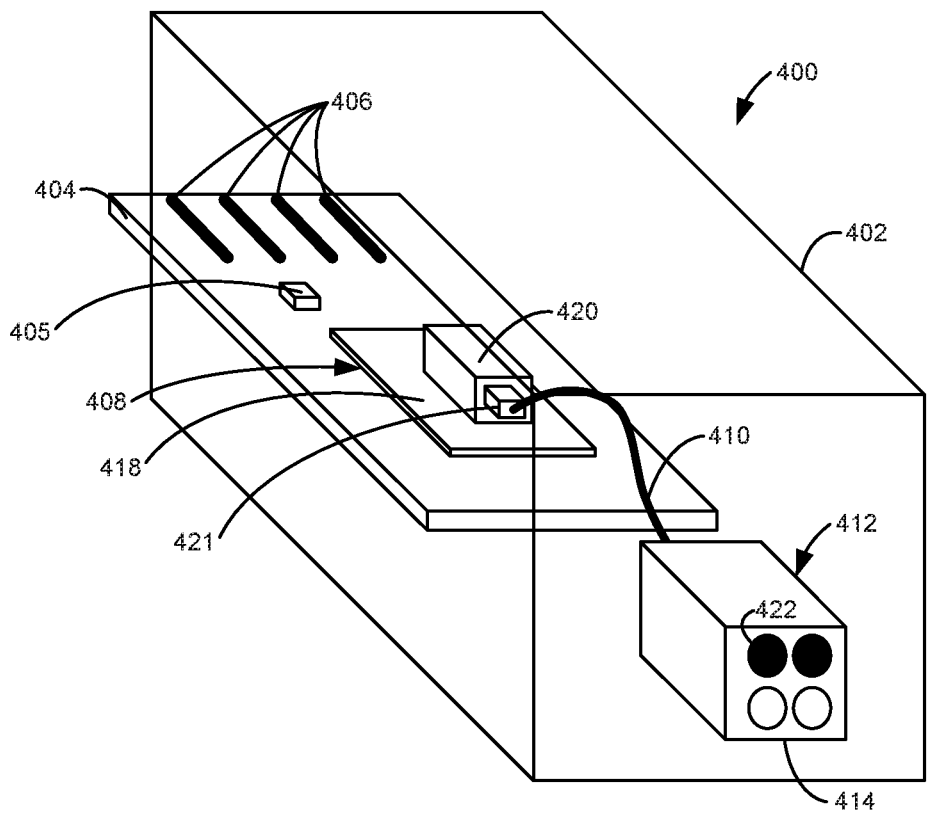
FIGS. 5A and 5B illustrate another example of a QSFP transceiver module.
Figure 5B:
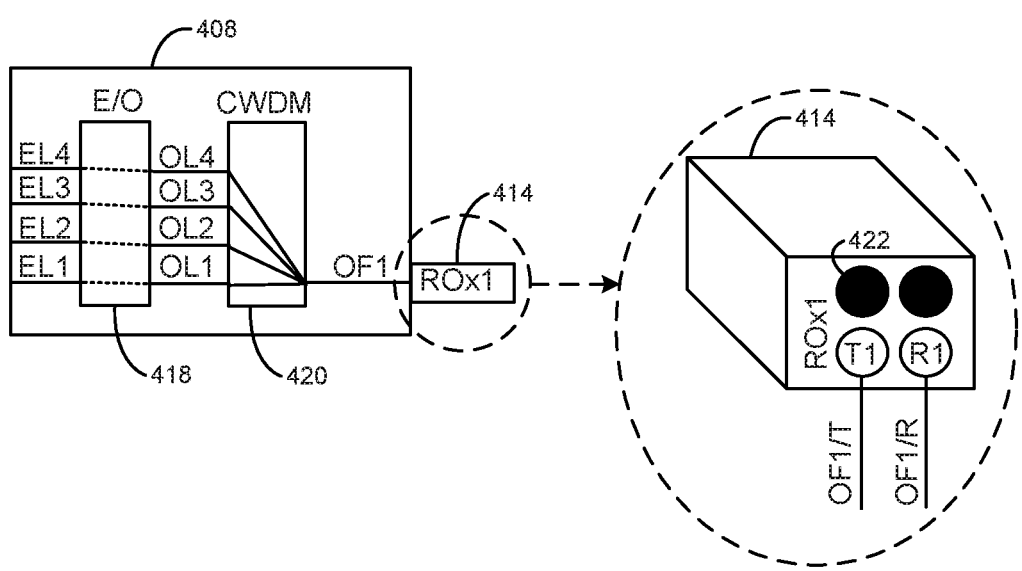

FIGS. 5A and 5B illustrate another example of a QSFP transceiver module 400. QSFP transceiver module 400 includes a housing 402, a PCB 404, a management controller 405, an optical transceiver 408, optical fiber jumpers 410, and a receptacle 412. In one example, receptacle 412 is an integral part of housing 402. In another example, receptacle 412 may be installed within housing 402. Receptacle 412 includes one ROx1 connector, i.e., one receptacle bay (ROx1) 414.

PCB 404 includes an electrical connector 406, such as a card edge connector, which is electrically coupled to optical transceiver 408 to pass electrical signals between optical transceiver 408 and a system in which QSFP transceiver module 400 is installed. Optical transceiver 408 is optically coupled to receptacle bay 414 via an optical fiber coupler 421 and optical fiber jumpers 410. Electrical connector 406 is electrically coupled to management controller 405 to pass management signals between management controller 405 and a system in which QSFP transceiver module 400 is installed. Management controller 405 controls the operation of QSPF transceiver module 400.

QSFP transceiver module 400 includes 4-lanes multiplexed onto 1-lane (e.g., a 2-fiber optical cable). As illustrated in FIG. 5B, receptacle bay 414 supports 1-lane through first transmit (OF1/T) and receive (OF1/R) optical fibers, which may be optically coupled to first transmit (T1) and receive (R1) optical fiber positions of receptacle bay 414, respectively. The black optical fiber positions, one of which is indicated for example at 422, are unused in this example. The unused optical fiber positions enable receptacle bay 414 to be connected to either a 1-lane single-density optical cable or a 2-lane double-density optical cable. If receptacle bay 414 is connected to a 2-lane double-density optical cable, one of the two lanes of the 2-lane double-density optical cable is unused.

Optical transceiver 408 includes an E/O transceiver chip 418 and a coarse wavelength division multiplexer (CWDM) 420. E/O transceiver chip 418 converts electrical signals received on a first electrical lane (EL1), a second electrical lane (EL2), a third electrical lane (EL3), and a fourth electrical lane (EL4) to provide optical signals on a first optical lane (OL1), a second optical lane (OL2), a third optical lane (OL3), and a fourth optical lane (OL4), and converts optical signals received on OL1, OL2, OL3, and OL4 to provide electrical signals on EL1, EL2, EL3, and EL4 respectively. EL1, EL2, EL3, and EL4 are electrically coupled to electrical connector 406. CWDM 420 multiplexes optical signals on OL1, OL2, OL3, and OL4 onto OF1 and demultiplexes optical signals on OF1 onto OL1, OL2, OL3, and OL4. OF1 may be optically coupled to OF1/T, OF1/R via receptacle bay 414.

Figure 6A:
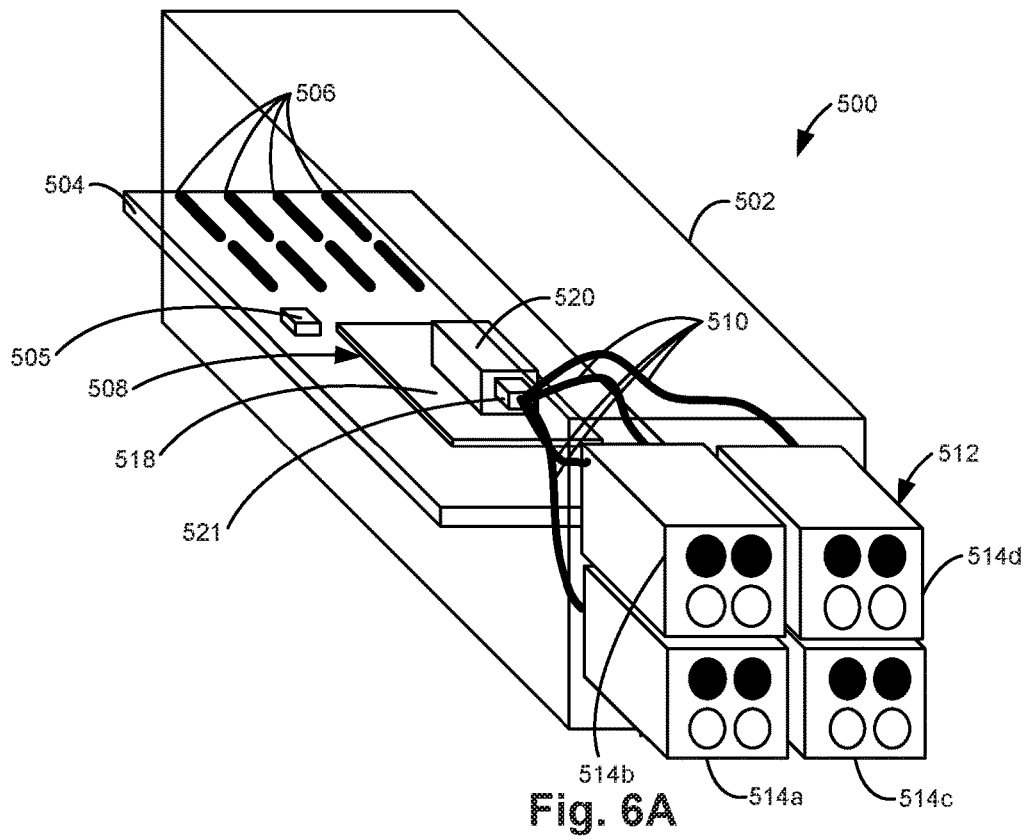
FIGS. 6A and 6B illustrate one example of a double-density quad small-form factor pluggable (QSFP-DD) transceiver module in a 4-lane mode (QSFP-DD4L).
Figure 6B:
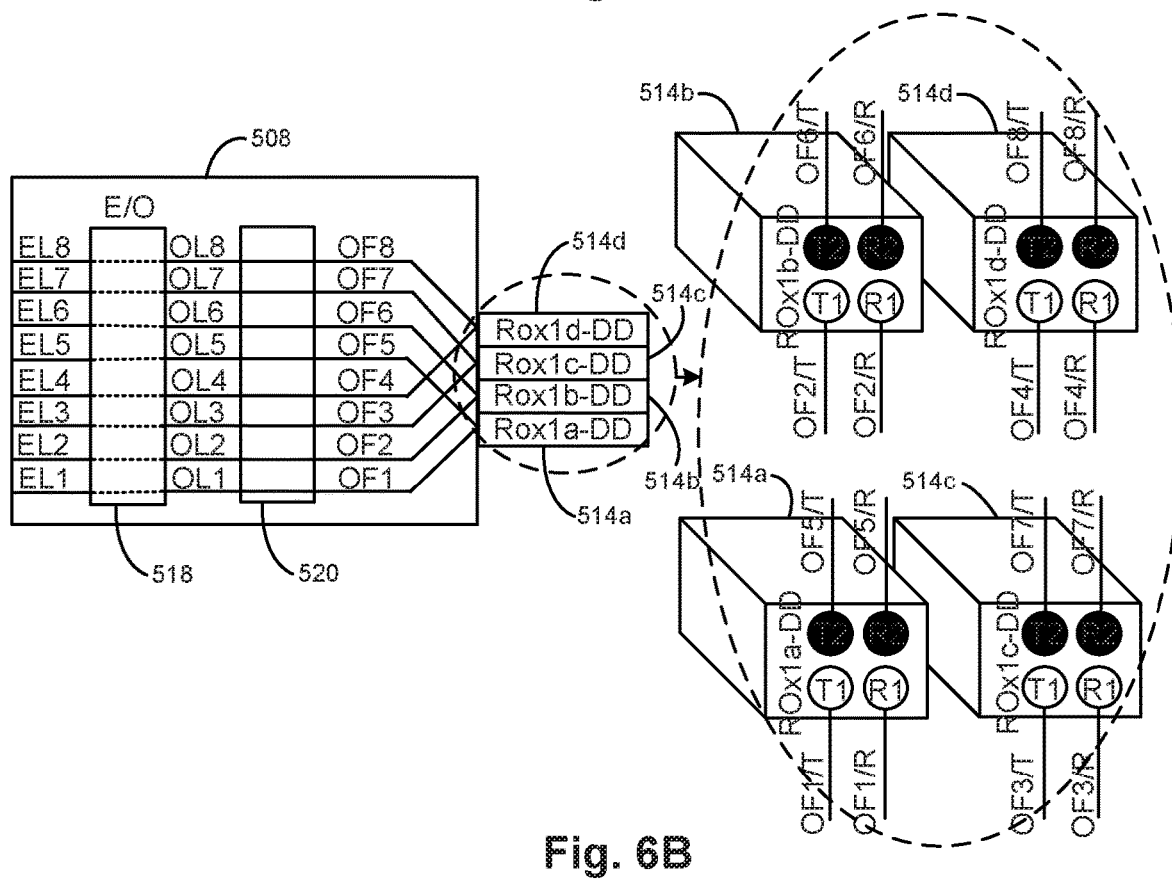

FIGS. 6A and 6B illustrate one example of a QSFP-DD transceiver module 500 in a 4-lane mode (QSFP-DD4L). QSFP-DD transceiver module 500 operates in a 4-lane mode when installed in a QSFP transceiver cage and in an 8-lane mode when installed in a QSFP-DD transceiver cage. QSFP-DD transceiver module 500 includes a housing 502, a PCB 504, a management controller 505, an optical transceiver 508, optical fiber jumpers 510, and a receptacle 512. In one example, QSFP-DD transceiver module 500 also includes a mode indicator (e.g., mode indicator 1022, which will be described with reference to FIG. 13A) indicating whether QSFP-DD transceiver module 500 is operating in the 4-lane mode and using half the number of optical fiber positions, or the 8-lane mode and using all the optical fiber positions. In one example, the mode indicator is turned off in the 4-lane mode and turned on in the 8-lane mode. The mode indicator may be inside a transceiver module or in a system. When the mode indicator is in a transceiver module, the mode indicator is directly controlled by the transceiver module's management controller. When the mode indicator is in a system, the mode indicator is indirectly controlled by the management controller via the transceiver module's electrical interface and the system controller. Hereafter, the mode indicator descriptions will be for the cases where the mode indicator is in a transceiver module. In one example, receptacle 512 is an integral part of housing 502. In another example, receptacle 512 may be installed within housing 502. Receptacle 512 includes one ROx4-DD connector including a first receptacle bay (ROx1a-DD) 514a, a second receptacle bay (ROx1b-DD) 514b, a third receptacle bay (ROx1c-DD) 514c, and a fourth receptacle bay (ROx1d-DD) 514d.

PCB 504 includes an electrical connector 506, such as a card edge connector, which is electrically coupled to optical transceiver 508 to pass electrical signals between optical transceiver 508 and a system in which QSFP-DD transceiver module 500 is installed. Optical transceiver 508 is optically coupled to each receptacle bay 514a, 514b, 514c, and 514d via an optical fiber coupler 521 and optical fiber jumpers 510.

Electrical connector 506 is electrically coupled to management controller 505 to pass management signals between management controller 505 and a system in which QSFP-DD transceiver module 500 is installed. Management controller 505 detects whether QSFP-DD transceiver module 500 is installed in a QSFP transceiver cage or a QSFP-DD transceiver cage and controls the operation of QSPF-DD transceiver module 500. Management controller 505 may also control the mode indicator. In one example, management controller 505 maps optical lanes to electrical lanes within optical transceiver 508 based on whether QSFP-DD transceiver module 500 is installed in a QSFP transceiver cage or a QSFP-DD transceiver cage. Management controller 505 sets QSFP-DD transceiver module 500 to operate in a 4-lane mode with QSFP-DD transceiver module 500 installed in a QSFP transceiver cage. Management controller 505 sets QSFP-DD transceiver module 500 to operate in an 8-lane mode with QSFP-DD transceiver module 500 installed in a QSFP-DD transceiver cage.

QSFP-DD transceiver module 500 includes 8-lanes. In the 4-lane mode, however, 4-lanes are unused. As illustrated in FIG. 6B, first receptacle bay 514a supports a first lane through first transmit (OF1/T) and receive (OF1/R) optical fibers, which may be optically coupled to first transmit (T1) and receive (R1) optical fiber positions of first receptacle bay 514a, respectively. Second receptacle bay 514b supports a second lane through second transmit (OF2/T) and receive (OF2/R) optical fibers, which may be optically coupled to first transmit (T1) and receive (R1) optical fiber positions of second receptacle bay 514b, respectively. Third receptacle bay 514c supports a third lane through third transmit (OF3/T) and receive (OF3/R) optical fibers, which may be optically coupled to first transmit (T1) and receive (R1) optical fiber positions of third receptacle bay 514c, respectively. Fourth receptacle bay 514d supports a fourth lane through fourth transmit (OF4/T) and receive (OF4/R) optical fibers, which may be optically coupled to first transmit (T1) and receive (R1) optical fiber positions of fourth receptacle bay 514d, respectively.

First receptacle bay 514a also supports an unused fifth lane through fifth transmit (OF5/T) and receive (OF5/R) optical fibers, which may be optically coupled to second transmit (T2) and receive (R2) optical fiber positions (indicated by black optical fiber positions) of first receptacle bay 514a, respectively. Second receptacle bay 514b also supports an unused sixth lane through sixth transmit (OF6/T) and receive (OF6/R) optical fibers, which may be optically coupled to second transmit (T2) and receive (R2) optical fiber positions (indicated by black optical fiber positions) of second receptacle bay 514b, respectively. Third receptacle bay 514c also supports an unused seventh lane through seventh transmit (OF7/T) and receive (OF7/R) optical fibers, which may be optically coupled to second transmit (T2) and receive (R2) optical fiber positions (indicated by black optical fiber positions) of third receptacle bay 514c, respectively. Fourth receptacle bay 514d also supports an unused eighth lane through eighth transmit (OF8/T) and receive (OF8/R) optical fibers, which may be optically coupled to second transmit (T2) and receive (R2) optical fiber positions (indicated by black optical fiber positions) of fourth receptacle bay 514d, respectively.

Optical transceiver 508 includes an E/O transceiver chip 518 and 1:1 micro-optics 520. In the 4-lane mode, management controller 505 activates EL1 through EL4 and deactivates EL5 through EL8. In the 4-lane mode, management controller 505 sets the lane mapping such that E/O transceiver chip 518 converts electrical signals received on electrical lanes EL1 through EL4 to provide optical signals on optical lanes OL1 through OL4, and converts optical signals received on the optical lanes OL1 through OL4 to provide electrical signals on the electrical lanes EL1 through EL4, respectively. EL1 through EL8 are electrically coupled to electrical connector 506. The 1:1 micro-optics 520 optically couple OL1 through OL8 to OF1 through OF8, respectively. OF1 through OF4 may be optically coupled to OF1/T, OF1/R through OF4/T, OF4/R via receptacle bays 514a through 514d, respectively. OF5 through OF8 may be optically coupled to OF5/T, OF5/R through OF8/T, OF8/R via receptacle bays 514a through 514d, respectively.

To enable interoperability between QSFP-DD transceiver module 500 and a QSFP transceiver module, such as QSFP transceiver module 200 previously described and illustrated with reference to FIGS. 3A and 3B, the lowest order four lanes OF1, OF2, OF3, and OF4 of QSFP-DD transceiver module 500 are configured the same as OF1, OF2, OF3, and OF4 of QSFP transceiver module 200. Therefore, OF1/T, OF1/R through OF4/T, OF4/R may be connected in the same manner to either QSFP-DD transceiver module 500 or QSFP transceiver module 200. Accordingly, a single-density optical cable may be used to interconnect QSFP-DD transceiver module 500 and QSFP transceiver module 200.

Figure 6C:
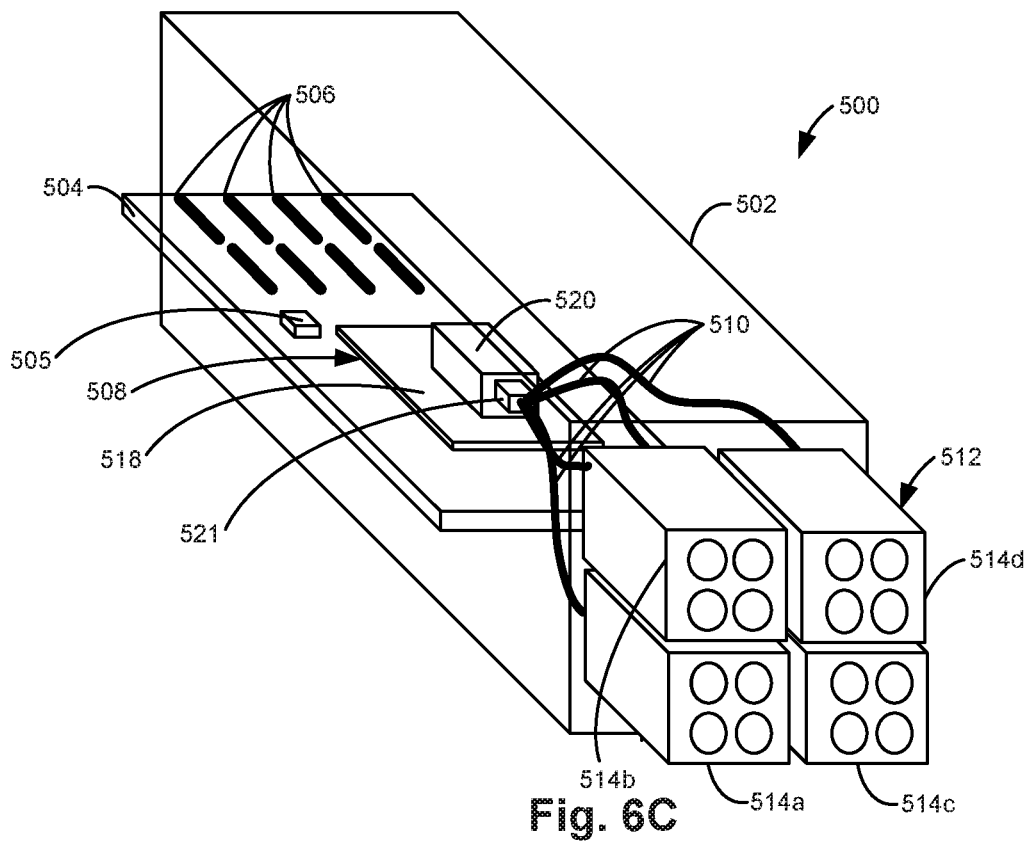
FIGS. 6C and 6D illustrate one example of a QSFP-DD transceiver module in an 8-lane mode (QSFP-DD8L).
Figure 6D:
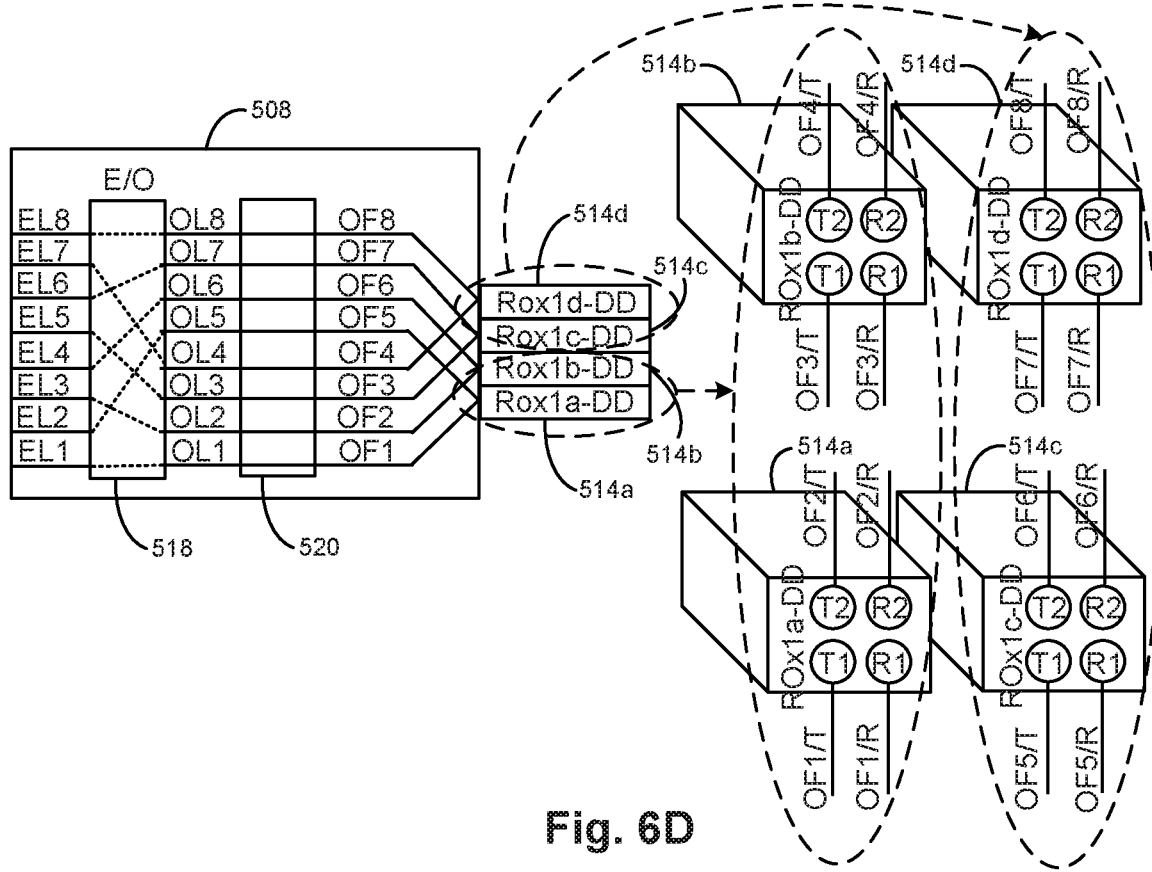

FIGS. 6C and 6D illustrate one example of QSFP-DD transceiver module 500 in an 8-lane mode (QSFP-DD8L). As illustrated in FIG. 6D, first receptacle bay 514a supports a first lane through first transmit (OF1/T) and receive (OF1/R) optical fibers, which may be optically coupled to first transmit (T1) and receive (R1) optical fiber positions of first receptacle bay 514a, respectively. First receptacle bay 514a also supports a second lane through second transmit (OF2/T) and receive (OF2/R) optical fibers, which may be optically coupled to second transmit (T2) and receive (R2) optical fiber positions of first receptacle bay 514a, respectively. Second receptacle bay 514b supports a third lane through third transmit (OF3/T) and receive (OF3/R) optical fibers, which may be optically coupled to first transmit (T1) and receive (R1) optical fiber positions of second receptacle bay 514b, respectively. Second receptacle bay 514b also supports a fourth lane through fourth transmit (OF4/T) and receive (OF4/R) optical fibers, which may be optically coupled to second transmit (T2) and receive (R2) optical fiber positions of second receptacle bay 514b, respectively.

Third receptacle bay 514c supports a fifth lane through fifth transmit (OF5/T) and receive (OF5/R) optical fibers, which may be optically coupled to first transmit (T1) and receive (R1) optical fiber positions of third receptacle bay 514c, respectively. Third receptacle bay 514c also supports a sixth lane through sixth transmit (OF6/T) and receive (OF6/R) optical fibers, which may be optically coupled to second transmit (T2) and receive (R2) optical fiber positions of third receptacle bay 514c, respectively. Fourth receptacle bay 514d supports a seventh lane through seventh transmit (OF7/T) and receive (OF7/R) optical fibers, which may be optically coupled to first transmit (T1) and receive (R1) optical fiber positions of fourth receptacle bay 514d, respectively. Fourth receptacle bay 514d also supports an eighth lane through eighth transmit (OF8/T) and receive (OF8/R) optical fibers, which may be optically coupled to second transmit (T2) and receive (R2) optical fiber positions of fourth receptacle bay 514d, respectively.

In the 8-lane mode, management controller 505 activates EL1 through EL8. In the 8-lane mode, management controller 505 sets the lane mapping (which is different from the 4-lane mode) such that E/O transceiver chip 518 converts electrical signals received on electrical lanes EL1, EL2, EL3, EL4, EL5, EL6, EL7, and EL8 to provide optical signals on optical lanes OL1, OL5, OL2, OL6, OL3, OL7, OL4, and OL8, and converts optical signals received on the optical lanes OL1, OL5, OL2, OL6, OL3, OL7, OL4, and OL8 to provide electrical signals on the electrical lanes EL1, EL2, EL3, EL4, EL5, EL6, EL7, and EL8, respectively. EL1 through EL8 are electrically coupled to electrical connector 506. The 1:1 micro-optics 520 optically couple OL1 through OL8 to OF1 through OF8, respectively. OF1, OF5, OF2, and OF6 may be optically coupled to OF1/T, OF1/R through OF4/T, OF4/R via receptacle bays 514a and 514b, respectively. OF3, OF7, OF4, and OF8 may be optically coupled to OF5/T, OF5/R through OF8/T, OF8/R via receptacle bays 514c and 514d, respectively.

Figure 7A:
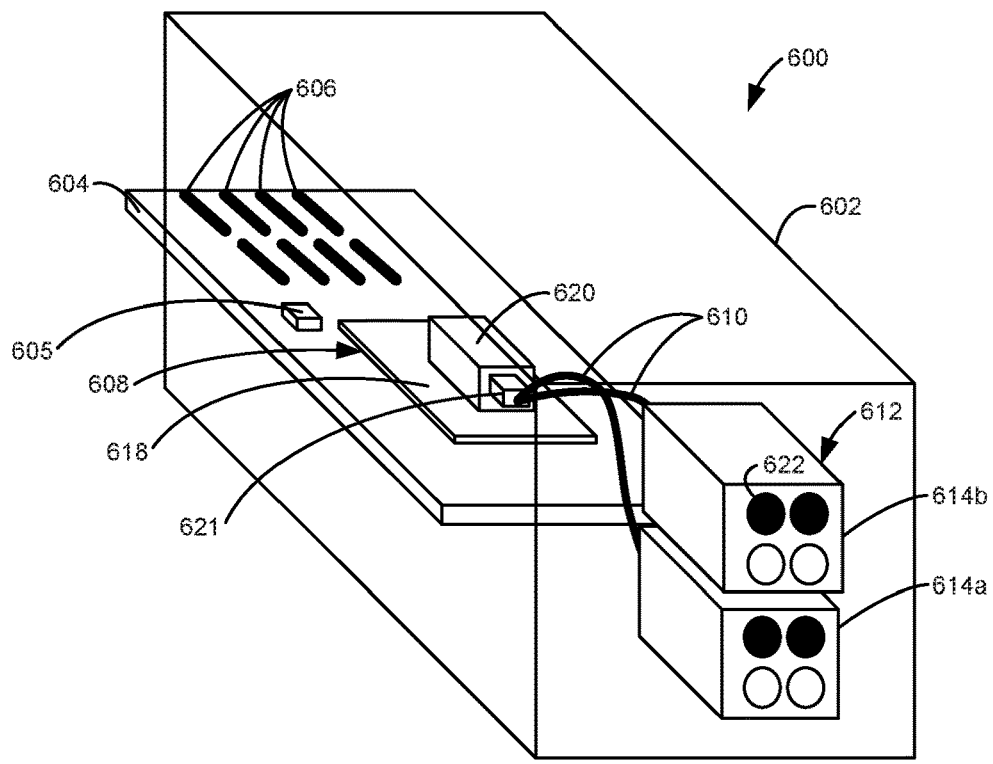
FIGS. 7A and 7B illustrate another example of a QSFP-DD transceiver module.
Figure 7B:
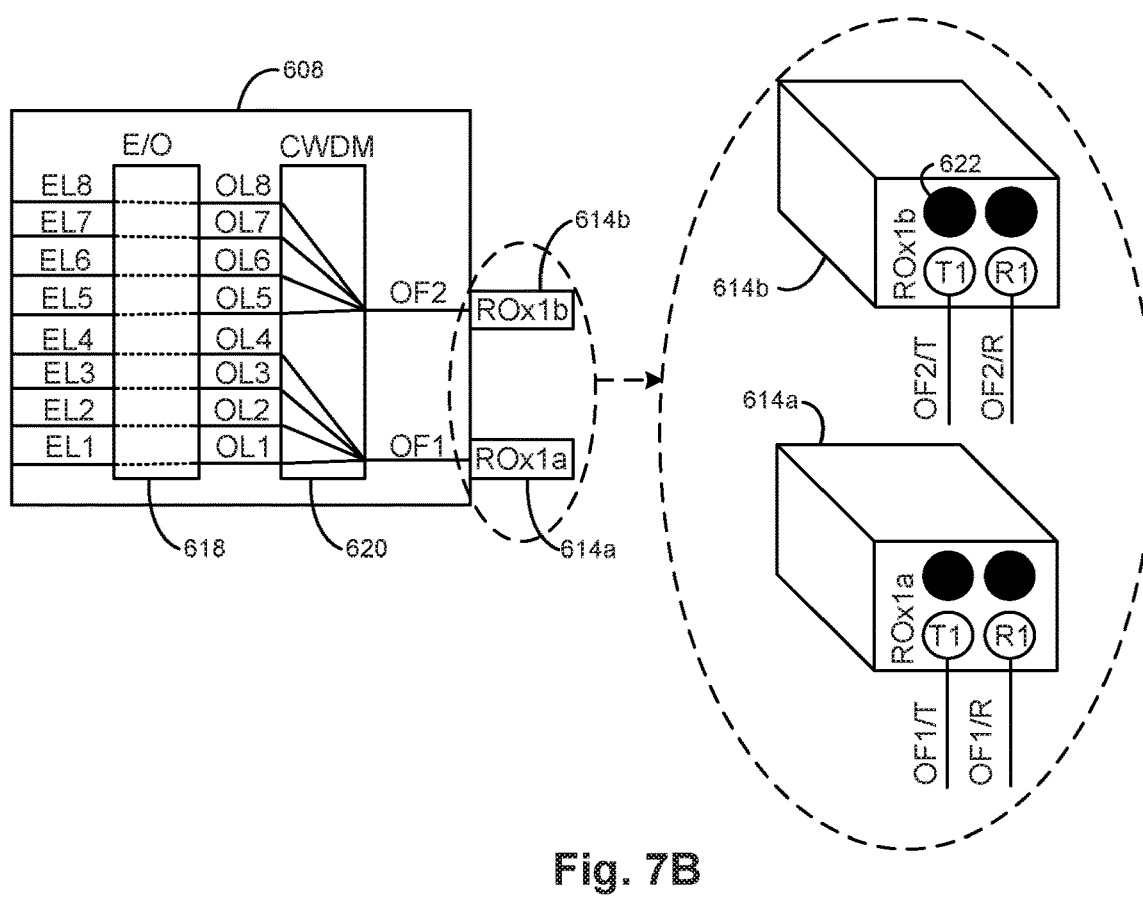

FIGS. 7A and 7B illustrate another example of a QSFP-DD transceiver module 600. QSFP-DD transceiver module 600 includes a housing 602, a PCB 604, a management controller 605, an optical transceiver 608, optical fiber jumpers 610, and a receptacle 612. In one example, receptacle 612 is an integral part of housing 602. In another example, receptacle 612 may be installed within housing 602. Receptacle 612 includes one ROx2 optical connector including a first receptacle bay (ROx1a) 614a and a second receptacle bay (ROx1b) 614b.

PCB 604 includes an electrical connector 606, such as a card edge connector, which is electrically coupled to optical transceiver 608 to pass electrical signals between optical transceiver 608 and a system in which QSFP-DD transceiver module 600 is installed. Optical transceiver 608 is optically coupled to each receptacle bay 614a and 614b via an optical fiber coupler 621 and optical fiber jumpers 610. Electrical connector 606 is electrically coupled to management controller 605 to pass management signals between management controller 605 and a system in which QSFP-DD transceiver module 600 is installed. Management controller 605 controls the operation of QSPF-DD transceiver module 600.

QSFP-DD transceiver module 600 includes 8-lanes multiplexed onto 2-lanes (e.g., a 4-fiber optical cable). As illustrated in FIG. 7B, first receptacle bay 614a supports a first lane through first transmit (OF1/T) and receive (OF1/R) optical fibers, which may be optically coupled to first transmit (T1) and receive (R1) optical fiber positions of first receptacle bay 614a, respectively. Second receptacle bay 614b supports a second lane through second transmit (OF2/T) and receive (OF2/R) optical fibers, which may be optically coupled to first transmit (T1) and receive (R1) optical fiber positions of second receptacle bay 614b, respectively. The black optical fiber positions, one of which is indicated for example at 622, are unused in this example. The unused optical fiber positions enable receptacle bay 614a and/or 614b to be connected to either a 1-lane single-density optical cable or a 2-lane double-density optical cable. If receptacle bay 614a or 614b is connected to a 2-lane double-density optical cable, one of the two lanes of the 2-lane double-density optical cable is unused.

Optical transceiver 608 includes an E/O transceiver chip 618 and a CWDM 620. E/O transceiver chip 618 converts electrical signals received on electrical lanes EL1 through EL8 to provide optical signals on optical lanes OL1 through OL8, and converts optical signals received on optical lanes OL1 through OL8 to provide electrical signals on electrical lanes EL1 through EL8, respectively. EL1 through EL8 are electrically coupled to electrical connector 606. CWDM 620 multiplexes optical signals on OL1, OL2, OL3, and OL4 onto OF1 and optical signals on OL5, OL6, OL7, and OL8 onto OF2. CWDM 620 demultiplexes optical signals on OF1 onto OL1, OL2, OL3, and OL4 and optical signals on OF2 onto OL5, OL6, OL7, and OL8. OF1 and OF2 may be optically coupled to OF1/T, OF1/R and OF2/T, OF2/R via receptacle bays 614a and 614b, respectively.

Figure 8A:
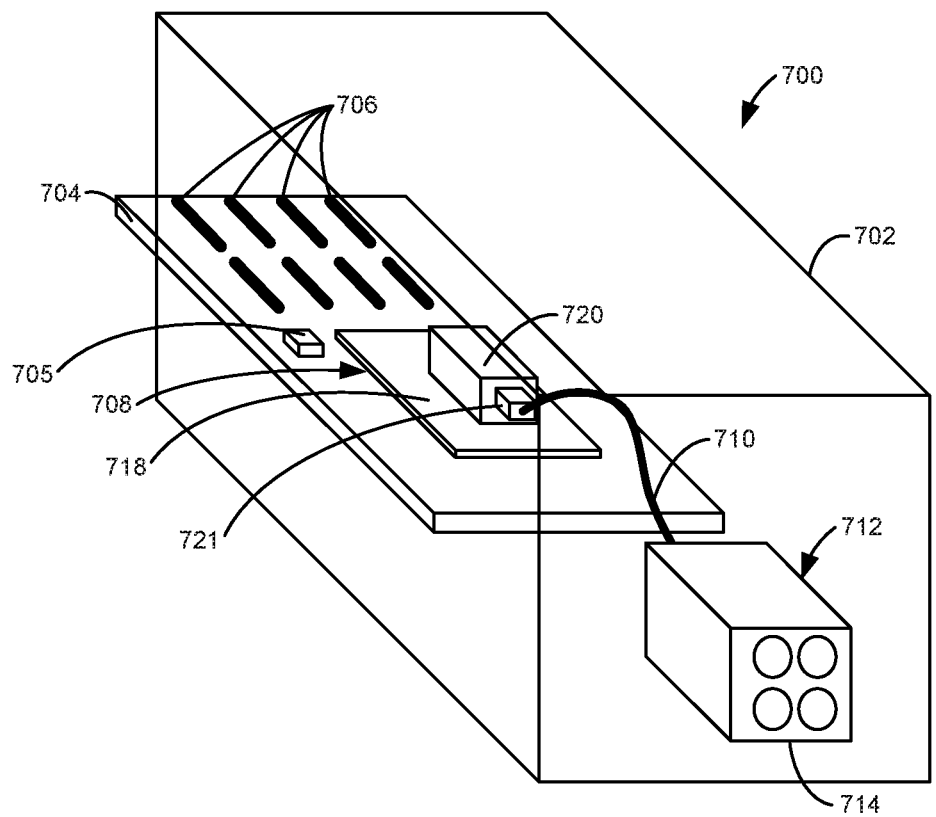
FIGS. 8A and 8B illustrate another example of a QSFP-DD transceiver module.
Figure 8B:
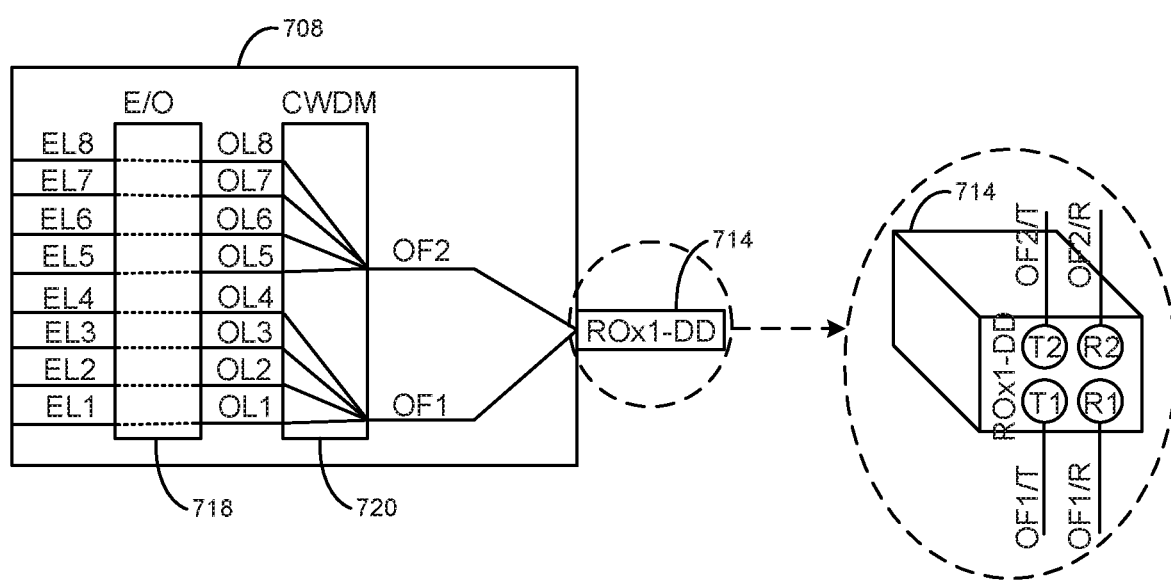

FIGS. 8A and 8B illustrate another example of a QSFP-DD transceiver module 700. QSFP-DD transceiver module 700 includes a housing 702, a PCB 704, a management controller 705, an optical transceiver 708, optical fiber jumpers 710, and a receptacle 712. In one example, receptacle 712 is an integral part of housing 702. In another example, receptacle 712 may be installed within housing 702. Receptacle 712 includes one ROx1-DD optical connector, i.e., one receptacle bay (ROx1-DD) 714.

PCB 704 includes an electrical connector 706, such as a card edge connector, which is electrically coupled to optical transceiver 708 to pass electrical signals between optical transceiver 708 and a system in which QSFP-DD transceiver module 700 is installed. Optical transceiver 708 is optically coupled to receptacle bay 714 via an optical fiber coupler 721 and optical fiber jumpers 710. Electrical connector 706 is electrically coupled to management controller 705 to pass management signals between management controller 705 and a system in which QSFP-DD transceiver module 700 is installed. Management controller 705 controls the operation of QSPF-DD transceiver module 700.

QSFP-DD transceiver module 700 includes 8-lanes multiplexed onto 2-lanes (e.g., a 4-fiber optical cable). As illustrated in FIG. 8B, receptacle bay 714 supports a first lane through first transmit (OF1/T) and receive (OF1/R) optical fibers, which may be optically coupled to first transmit (T1) and receive (R1) optical fiber positions of receptacle bay 714, respectively. Receptacle bay 714 also supports a second lane through second transmit (OF2/T) and receive (OF2/R) optical fibers, which may be optically coupled to second transmit (T2) and receive (R2) optical fiber positions of receptacle bay 714, respectively.

Optical transceiver 708 includes an E/O transceiver chip 718 and a CWDM 720. E/O transceiver chip 718 converts electrical signals received on electrical lanes EL1 through EL8 to provide optical signals on optical lanes OL1 through OL8, and converts optical signals received on optical lanes OL1 through OL8 to provide electrical signals on electrical lanes EL1 through EL8, respectively. EL1 through EL8 are electrically coupled to electrical connector 706. CWDM 720 multiplexes optical signals on OL1, OL2, OL3, and OL4 onto OF1 and optical signals on OL5, OL6, OL7, and OL8 onto OF2. CWDM 720 demultiplexes optical signals on OF1 onto OL1, OL2, OL3, and OL4 and optical signals on OF2 onto OL5, OL6, OL7, and OL8. OF1 and OF2 may be optically coupled to OF1/T, OF1/R and OF2/T, OF2/R, respectively, via receptacle bay 714.

Figure 9A:
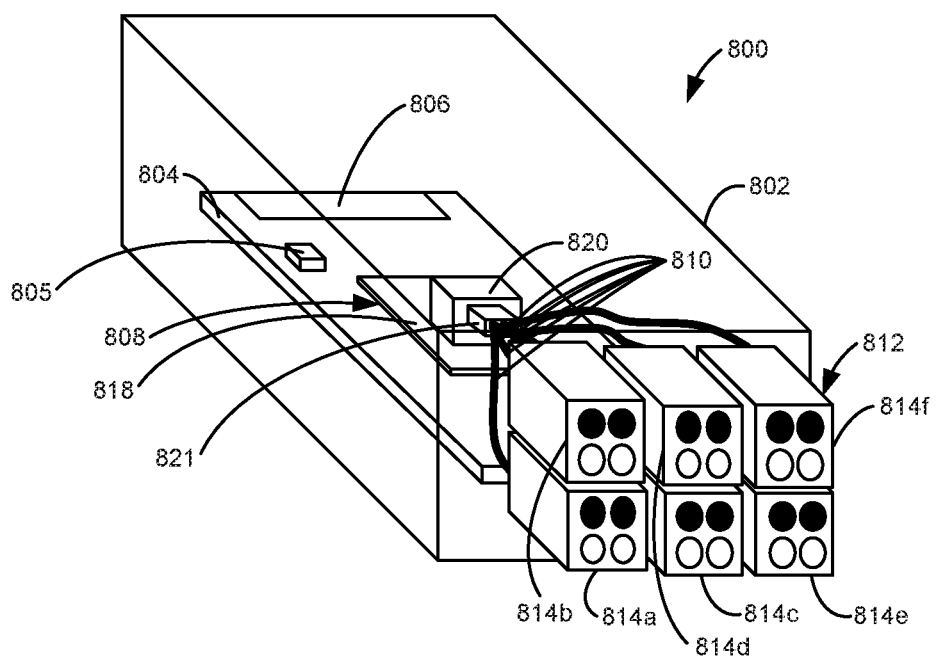
FIGS. 9A and 9B illustrate one example of a hot-pluggable 24-lane optical transceiver module.
Figure 9B:
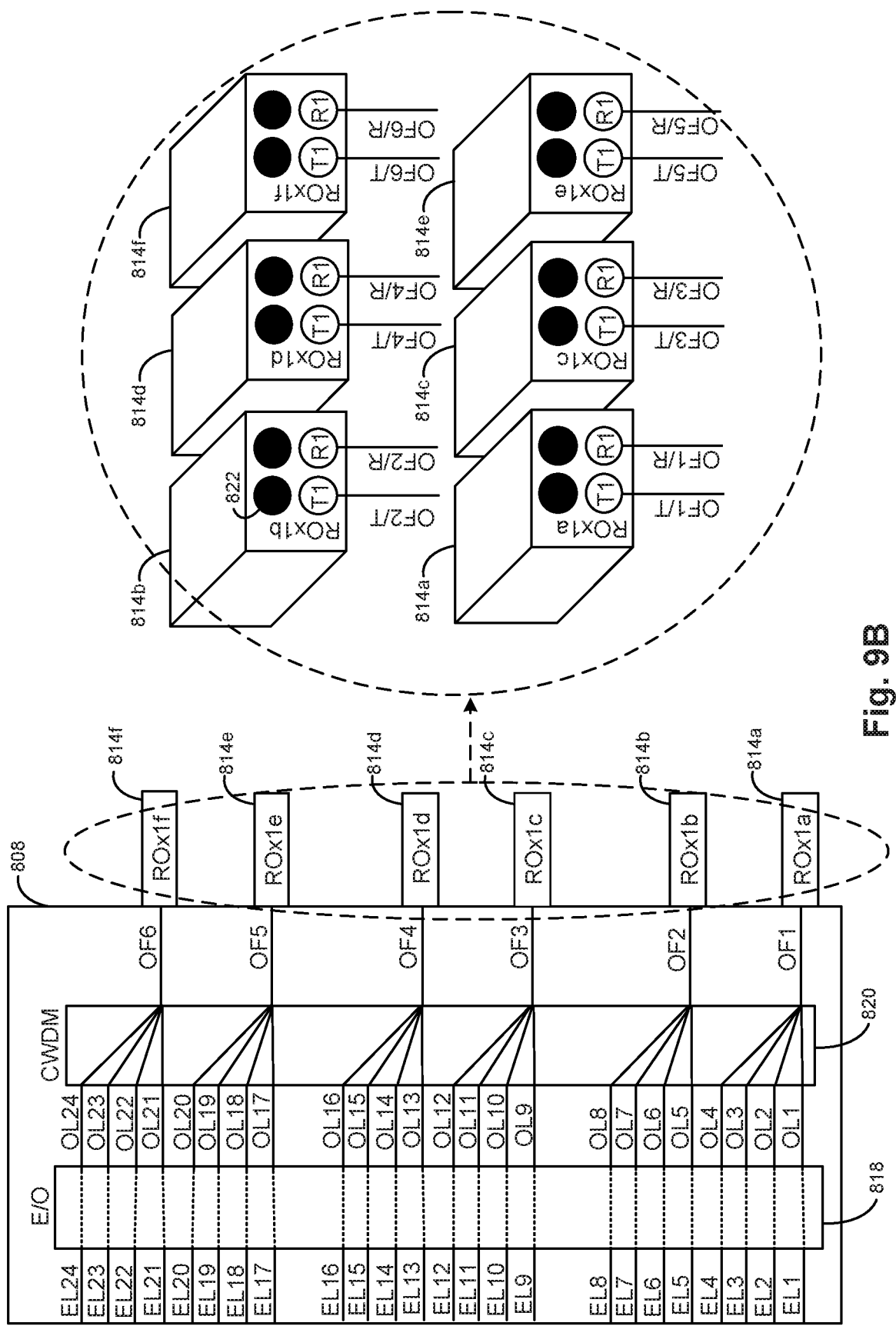

FIGS. 9A and 9B illustrate one example of a hot-pluggable 24-lane optical transceiver module 800, also known as a hot-pluggable line pod (HLP) transceiver module. HLP transceiver module 800 includes a housing 802, a PCB 804, a management controller 805, an optical transceiver 808, optical fiber jumpers 810, and a receptacle 812. In one example, receptacle 812 is an integral part of housing 802. In another example, receptacle 812 may be installed within housing 802. Receptacle 812 includes three ROx2 optical connectors including a first receptacle bay (ROx1a) 814a, a second receptacle bay (ROx1b) 814b, a third receptacle bay (ROx1c) 814c, a fourth receptacle bay (ROx1d) 814d, a fifth receptacle bay (ROx1e) 814e, and a sixth receptacle bay (ROx1f) 814f.

PCB 804 includes an electrical connector 806, such as a card edge connector, which is electrically coupled to optical transceiver 808 to pass electrical signals between optical transceiver 808 and a system in which HLP transceiver module 800 is installed. Optical transceiver 808 is optically coupled to each receptacle bay 814a, 814b, 814c, 814d, 814e, and 814f via an optical fiber coupler 821 and optical fiber jumpers 810. Electrical connector 806 is electrically coupled to management controller 805 to pass management signals between management controller 805 and a system in which HLP transceiver module 800 is installed. Management controller 805 controls the operation of HLP transceiver module 800.

HLP transceiver module 800 includes 24-lanes multiplexed onto 6-lanes (e.g., a 12-fiber optical cable). As illustrated in FIG. 9B, first receptacle bay 814a supports a first lane through first transmit (OF1/T) and receive (OF1/R) optical fibers, which may be optically coupled to first transmit (T1) and receive (R1) optical fiber positions of first receptacle bay 814a, respectively. Second receptacle bay 814b supports a second lane through second transmit (OF2/T) and receive (OF2/R) optical fibers, which may be optically coupled to first transmit (T1) and receive (R1) optical fiber positions of second receptacle bay 814b, respectively. Third receptacle bay 814c supports a third lane through third transmit (OF3/T) and receive (OF3/R) optical fibers, which may be optically coupled to first transmit (T1) and receive (R1) optical fiber positions of third receptacle bay 814c, respectively.

Fourth receptacle bay 814d supports a fourth lane through fourth transmit (OF4/T) and receive (OF4/R) optical fibers, which may be optically coupled to first transmit (T1) and receive (R1) optical fiber positions of fourth receptacle bay 814d, respectively. Fifth receptacle bay 814e supports a fifth lane through fifth transmit (OF5/T) and receive (OF5/R) optical fibers, which may be optically coupled to first transmit (T1) and receive (R1) optical fiber positions of fifth receptacle bay 814e, respectively. Sixth receptacle bay 814f supports a sixth lane through sixth transmit (OF6/T) and receive (OF6/R) optical fibers, which may be optically coupled to first transmit (T1) and receive (R1) optical fiber positions of sixth receptacle bay 814f, respectively.

The black optical fiber positions, one of which is indicated for example at 822, are unused in this example. The unused optical fiber positions enable each receptacle bay 814a through 814f to be connected to either a 1-lane single-density optical cable or a 2-lane double-density optical cable. If a receptacle bay 814a through 814f is connected to a 2-lane double-density optical cable, one of the two lanes of the 2-lane double-density optical cable is unused.

Optical transceiver 808 includes an E/O transceiver chip 818 and a CWDM 820. E/O transceiver chip 818 converts electrical signals received on electrical lanes EL1 through EL24 to provide optical signals on optical lanes OL1 through OL24, and converts optical signals received on optical lanes OL1 through OL24 to provide electrical signals on electrical lanes EL1 through EL24, respectively. EL1 through EL24 are electrically coupled to electrical connector 806. CWDM 820 multiplexes optical signals on OL1 through OL4 onto OF1, optical signals on OL5 through OL8 onto OF2, optical signals on OL9 through OL12 onto OF3, optical signals on OL13 through OL16 onto OF4, optical signals on OL17 through OL20 onto OF5, and optical signals on OL21 through OL24 onto OF6. CWDM 820 demultiplexes optical signals on OF1 onto OL1 through OL4, optical signals on OF2 onto OL5 through OL8, optical signals on OF3 onto OL9 through OL12, optical signals on OF4 onto OL13 through OL16, optical signals on OF5 onto OL17 through OL20, and optical signals on OF6 onto OL21 through OL24. OF1 through OF6 may be optically coupled to OF1/T, OF1/R through OF6/T, OF6/R via receptacle bays 814a through 814f, respectively.

Figure 10A:
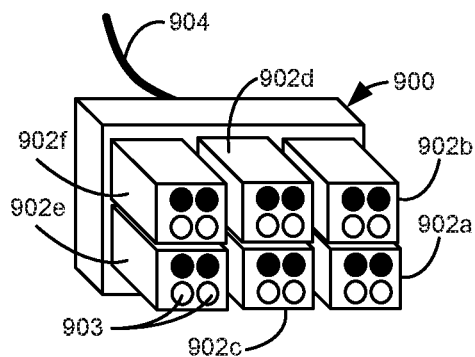
FIGS. 10A-10C illustrate example optical cables for connecting to optical transceiver modules.
Figure 10B:
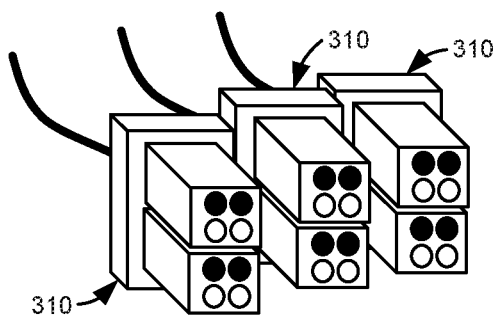
Figure 10C:
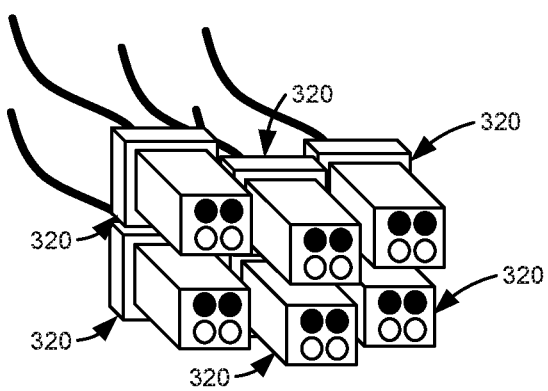

FIGS. 10A-10C illustrate example optical cables for connecting to optical transceiver modules. While the connector of one end of each optical cable is illustrated in FIGS. 10A-10C, the connector of the other end of each optical cable is similar to the illustrated connector, with transmit optical fibers on one end arranged to be receive optical fibers on the other end.

FIG. 10A illustrates a 6-connector receptacle bay 6-lane single-density (ROx6) optical cable 900. Accordingly, optical cable 900 is a multi-connector bay optical cable. Optical cable 900 includes six connector bays 902a through 902f for connecting to six receptacle bays, such as receptacle bays 814a through 814f, respectively, of HLP transceiver module 800 previously described and illustrated with reference to FIGS. 9A and 9B. In this example, each connector bay 902a through 902f supports 1-lane and includes two optical fibers. Each connector bay 902a through 902f includes two optical fiber positions, indicated for example at 903, which are aligned with the T1 and R1 optical fiber positions of a corresponding receptacle bay when optical cable 900 is coupled to a transceiver module receptacle. For ROx6 cable optical cable 900, 12 optical fibers for 6-lanes are included within bundled optical fibers 904.

FIG. 10B illustrates three optical cables 310, as previously described and illustrated with reference to FIG. 4C, where each optical cable 310 is for connecting to two receptacle bays, such as receptacle bays 814a and 814b, receptacle bays 814c and 814d, and receptacle bays 814e and 814f of HLP transceiver module 800 previously described and illustrated with reference to FIGS. 9A and 9B.

FIG. 10C illustrates six optical cables 320, as previously described and illustrated with reference to FIG. 4E, where each optical cable 320 is for connecting to one receptacle bay, such as receptacle bay 814a, 814b, 814c, 814d, 814e, or 814f of HLP transceiver module 800 previously described and illustrated with reference to FIGS. 9A and 9B. Accordingly, by selecting the appropriate optical cables 900, 310, or 320 for the application, breakout cables and/or breakout boxes may be avoided.

FIG. 11 illustrates one example of a 1-connector bay 2-lane double-density (ROx1-DD) to 2-connector bay 2-lane single-density (ROx2) optical cable 920. Optical cable 920 may be used, for example, to connect a QSFP-DD transceiver module to a SPF-DD transceiver module or a QSFP transceiver module. On one end, optical cable 920 includes one connector bay 930 for connecting to one receptacle bay. On the other end, optical cable 920 includes two connector bays 940a and 940b for connecting to two receptacle bays. Connector bay 930 includes an optical ferrule 932 supporting a first two optical fiber positions 934 and a second two optical fiber positions 935. Connector bay 940a includes an optical ferrule 942 supporting two optical fiber positions 944 and two unused optical fiber positions 946. Connector bay 940b includes an optical ferrule 942 supporting two optical fiber positions 945 and two unused optical fiber positions 946. A first two optical fibers are coupled between optical fiber positions 934 and 944, and a second two optical fibers are coupled between optical fiber positions 935 and 945, respectively, as indicated at 924.

FIG. 12 illustrates one example of a 4-connector bay 4-lane single-density (ROx4) to 2-connector bay 4-lane double-density (ROx2-DD) optical cable 950. Optical cable 950 may be used, for example, to connect a QSFP transceiver module to a QSFP-DD transceiver module. On one end, optical cable 950 includes four connector bays 960*a* through 960*d* for connecting to four receptacle bays. On the other end, optical cable 950 includes two connector bays 970*a* and 970*b* for connecting to two receptacle bays. Each connector bay 960*a* through 960*d* includes an optical ferrule 962 supporting two optical fiber positions 964 and two unused optical fiber positions 966. Each connector bay 970*a* and 970*b* includes an optical ferrule 972 supporting a first two optical fiber positions 974 and a second two optical fiber positions 975. A first two optical fibers are coupled between optical fiber positions 964 of connector bay 960*a* and optical fiber positions 974 of connector bay 970*a*. A second two optical fibers are coupled between optical fiber positions 964 of connector bay 960*b* and optical fiber positions 975 of connector bay 970*a*. A third two optical fibers are coupled between optical fiber positions 964 of connector bay 960*c* and optical fiber positions 974 of connector bay 970*b*. A fourth two optical fibers are coupled between optical fiber positions 964 of connector bay 960*d* and optical fiber positions 975 of connector bay 970*b*. The eight optical fibers are indicated at 954.

Figure 13A:
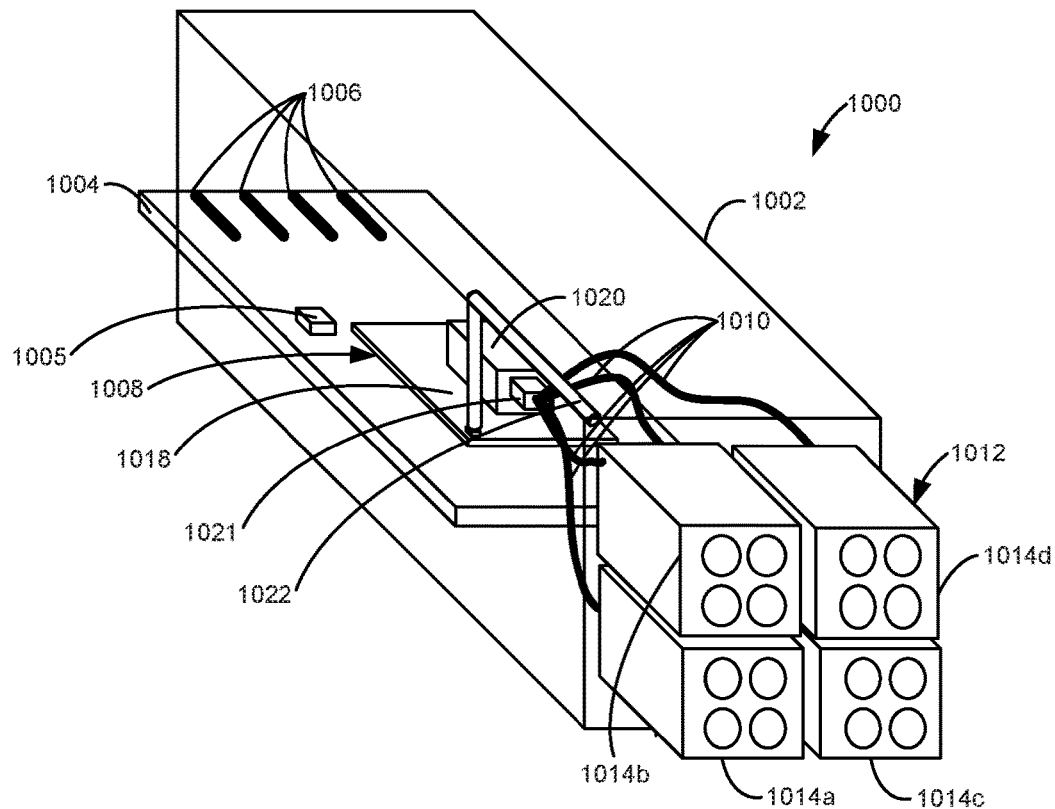
FIGS. 13A and 13B illustrate one example of a QSFP-2XO transceiver module.
Figure 13B:
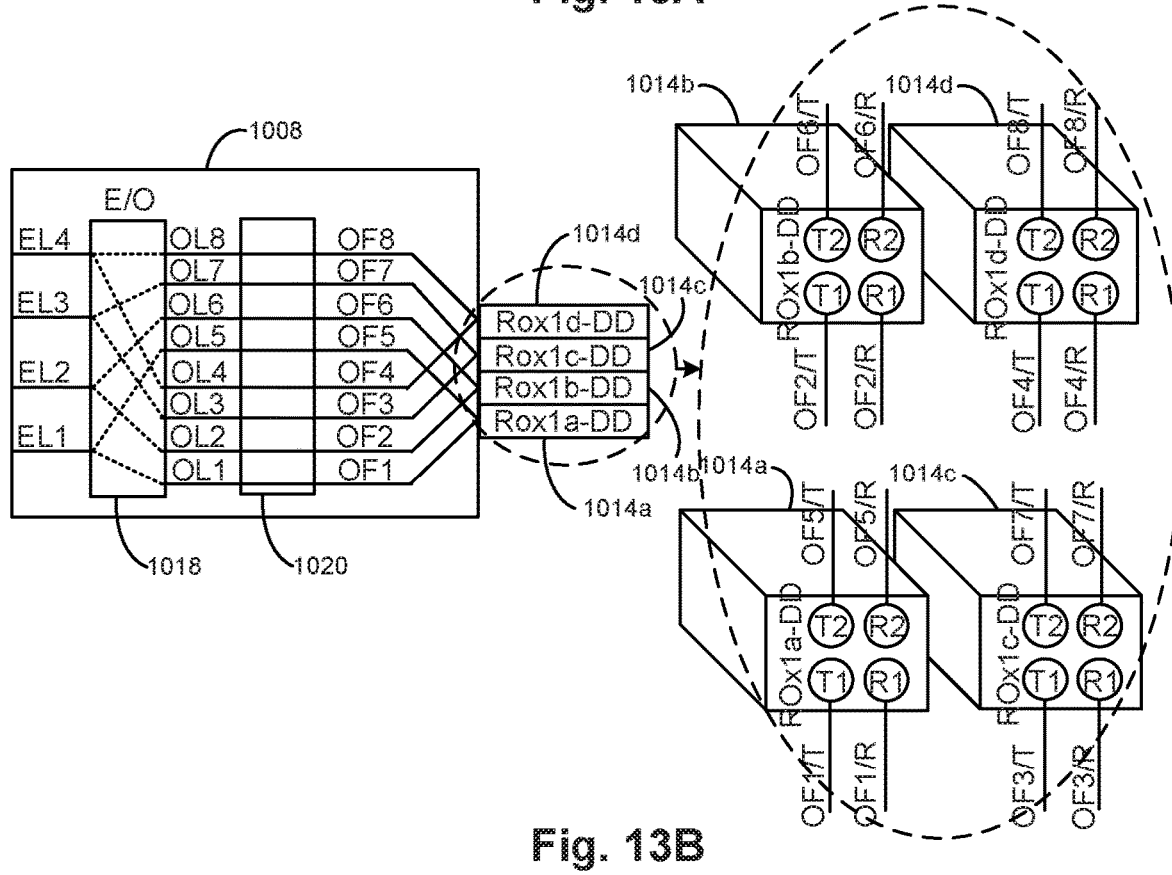

FIGS. 13A and 13B illustrate one example of a QSFP-2XO transceiver module 1000. QSFP-2XO transceiver module 1000 operates in a 4-optical-lane (four optical lanes mapped to four "half rate" electrical lanes) mode and uses half the number of optical fiber positions when installed in a QSFP transceiver cage and in an 8-optical-lane (eight optical lanes mapped to four "full rate" electrical lanes) mode and uses all the optical fiber positions when installed in a QSFP-2XO transceiver cage. QSFP-2XO transceiver module 1000 allows the use of optical lanes at half the data rate of the electrical lanes to allow time to market, as well as using less expensive and potentially more reliable optical components with the tradeoff of using optical cables with twice the number of optical fibers. QSFP-2XO transceiver module 1000 includes a housing 1002, a PCB 1004, a management controller 1005, an optical transceiver 1008, optical fiber jumpers 1010, a receptacle 1012, and a mode indicator 1022. In one example, receptacle 1012 is an integral part of housing 1002. In another example, receptacle 1012 may be installed within housing 1002. Receptacle 1012 includes one ROx4-DD connector including a first receptacle bay (ROx1a-DD) 1014*a*, a second receptacle bay (ROx1b-DD) 1014*b*, a third receptacle bay (ROx1c-DD) 1014*c*, and a fourth receptacle bay (ROx1d-DD) 1014*d*.

PCB 1004 includes an electrical connector 1006, such as a card edge connector, which is electrically coupled to optical transceiver 1008 to pass electrical signals between optical transceiver 1008 and a system in which QSFP-2XO transceiver module 1000 is installed. Optical transceiver 1008 is optically coupled to each receptacle bay 1014*a*, 1014*b*, 1014*c*, and 1014*d* via an optical fiber coupler 1021 and optical fiber jumpers 1010.

Electrical connector 1006 is electrically coupled to management controller 1005 to pass management signals between management controller 1005 and a system in which QSFP-2XO transceiver module 1000 is installed. Management controller 1005 detects whether QSFP-DD transceiver module 1000 is installed in a QSFP transceiver cage or a QSFP-2XO transceiver cage and controls the operation of QSPF-2XO transceiver module 1000. Management controller 1005 may also control mode indicator 1022. In one example, management controller 1005 controls the operation of optical transceiver 1018 based on whether QSFP-2XO transceiver module 1000 is installed in a QSFP transceiver cage or a QSFP-2XO transceiver cage. Management controller 1005 sets QSFP-2XO transceiver module 1000 to operate in a 4-optical-lane (half-rate) mode with QSFP-2XO transceiver module 1000 installed in a QSFP transceiver cage. Management controller 1005 sets QSFP-2XO transceiver module 1000 to operate in an 8-optical-lane (full-rate) mode with QSFP-2XO transceiver module 1000 installed in a QSFP-2XO transceiver cage. Mode indicator 1022 indicates whether QSFP-2XO transceiver module 1000 is operating in the 4-optical-lane mode or the 8-optical-lane mode. In one example, mode indicator 1022 is turned off in the 4-optical-lane mode and turned on in the 8-optical-lane mode. In one example, mode indicator 1022 includes a light emitting diode controlled by management controller 1005 and a light pipe to provide an indicator light on housing 1002.

QSFP-2XO transceiver module 1000 includes 8-lanes. In the 4-optical-lane mode, however, 4-lanes are unused. As illustrated in FIG. 13B, in both the 4-optical-lane mode and the 8-optical-lane mode, first receptacle bay 1014*a* supports a first lane through first transmit (OF1/T) and receive (OF1/R) optical fibers, which may be optically coupled to first transmit (T1) and receive (R1) optical fiber positions of first receptacle bay 1014*a*, respectively. Second receptacle bay 1014*b* supports a second lane through second transmit (OF2/T) and receive (OF2/R) optical fibers, which may be optically coupled to first transmit (T1) and receive (R1) optical fiber positions of second receptacle bay 1014*b*, respectively. Third receptacle bay 1014*c* supports a third lane through third transmit (OF3/T) and receive (OF3/R) optical fibers, which may be optically coupled to first transmit (T1) and receive (R1) optical fiber positions of third receptacle bay 1014*c*, respectively. Fourth receptacle bay 1014*d* supports a fourth lane through fourth transmit (OF4/T) and receive (OF4/R) optical fibers, which may be optically coupled to first transmit (T1) and receive (R1) optical fiber positions of fourth receptacle bay 1014*d*, respectively.

In the 8-optical-lane mode, first receptacle bay 1014*a* also supports a fifth lane through fifth transmit (OF5/T) and receive (OF5/R) optical fibers, which may be optically coupled to second transmit (T2) and receive (R2) optical fiber positions of first receptacle bay 1014*a*, respectively. Second receptacle bay 1014*b* also supports a sixth lane through sixth transmit (OF6/T) and receive (OF6/R) optical fibers, which may be optically coupled to second transmit (T2) and receive (R2) optical fiber positions of second receptacle bay 1014*b*, respectively. Third receptacle bay 1014*c* also supports an seventh lane through seventh transmit (OF7/T) and receive (OF7/R) optical fibers, which may be optically coupled to second transmit (T2) and receive (R2) optical fiber positions of third receptacle bay 1014*c*, respectively. Fourth receptacle bay 1014*d* also supports an eighth lane through eighth transmit (OF8/T) and receive (OF8/R) optical fibers, which may be optically coupled to second transmit (T2) and receive (R2) optical fiber positions of fourth receptacle bay 1014*d*, respectively. In the 4-optical-lane mode, the second transmit (T2) and receive (R2) optical fiber positions of each receptacle bay 1014*a* through 1014*d* are unused.

Optical transceiver 1008 includes an E/O transceiver chip 1018 and 1:1 micro-optics 1020. In the 4-optical-lane mode, E/O transceiver chip 1018 converts electrical signals received on electrical lanes EL1 through EL4 to provide optical signals on optical lanes OL1 through OL4, and converts optical signals received on optical lanes OL1 through OL4 to provide electrical signals on electrical lanes EL1 through EL4, respectively. In the 4-optical-lane mode, the data rate on each EL and OL is the same (e.g., 25 Gbps/lane). In the 8-optical-lane mode, E/O transceiver chip 1018 demultiplexes electrical signals received on electrical lanes EL1 through EL4 and converts the demultiplexed electrical signals to provide optical signals on optical lanes OL1 through OL8, and converts optical signals received on the optical lanes OL1 through OL8 and multiplexes the converted optical signals to provide electrical signals on the electrical lanes EL1 through EL4, respectively. In the 8-optical-lane mode, the data rate on each EL (e.g., 50 Gbps/lane) is twice the data rate on each OL (e.g., 25 Gbps/lane). EL1 through EL4 are electrically coupled to electrical connector 1006. The 1:1 micro-optics 1020 optically couple OL1 through OL8 to OF1 through OF8, respectively. OF1 through OF4 may be optically coupled to OF1/T, OF1/R through OF4/T, OF4/R via receptacle bays 1014a through 1014d, respectively. OF5 through OF8 may be optically coupled to OF5/T, OF5/R through OF8/T, OF8/R via receptacle bays 1014a through 1014d, respectively.

Figure 14:
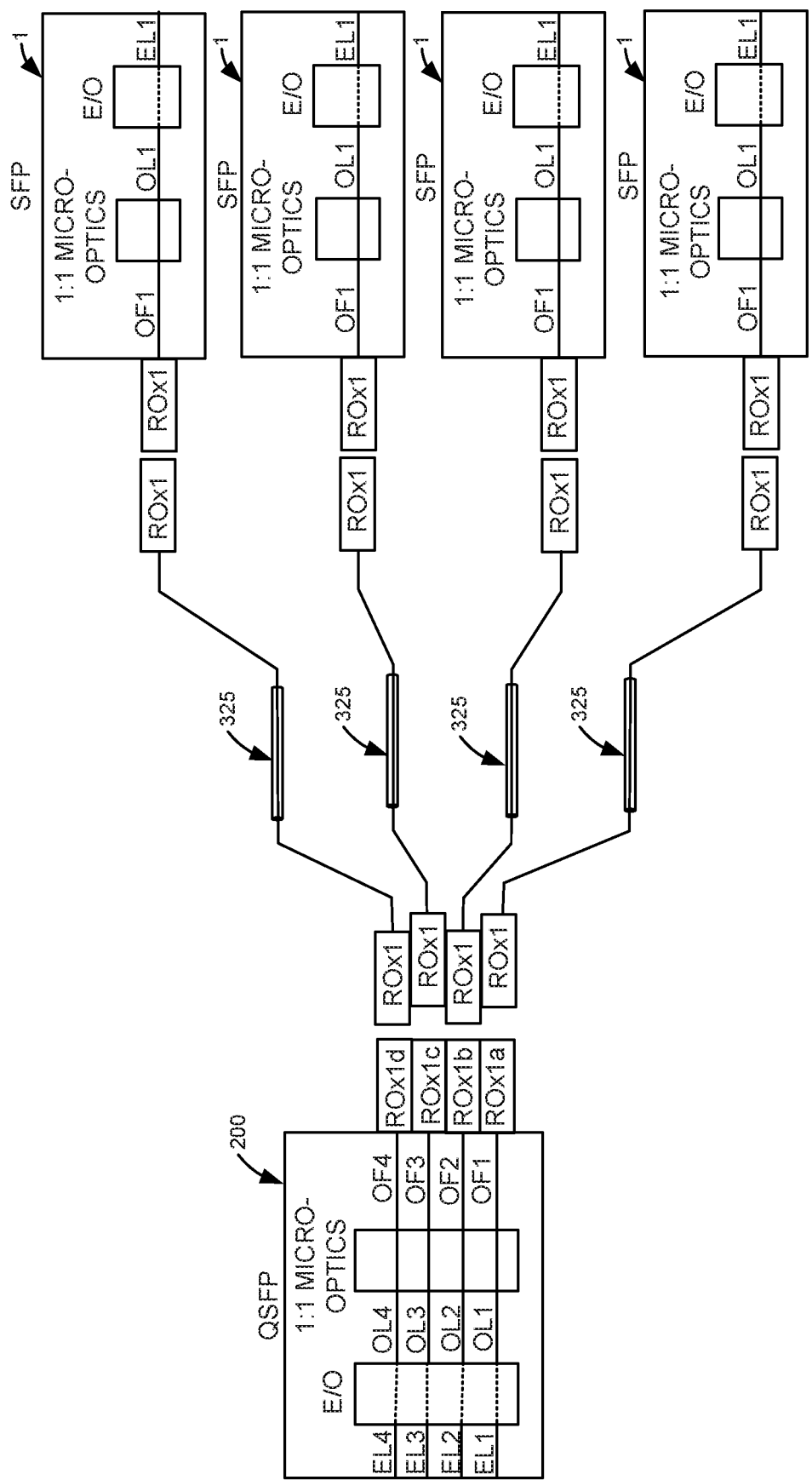
FIG. 14 illustrates one example of a system topology including a QSFP transceiver module and four SFP transceiver modules.

FIG. 14 illustrates one example of a system topology including a QSFP transceiver module 200 and four SFP transceiver modules 1. QSFP transceiver module 200 was previously described and illustrated with reference to FIGS. 3A and 3B. SFP transceiver module 1 was previously described and illustrated with reference to FIGS. 1A and 1B. As illustrated in FIG. 14, a QSFP transceiver module 200 may be communicatively coupled to four SFP transceiver modules 1 by using four 1-connector bay 1-lane single-density (ROx1) optical cables 325, which were previously described and illustrated with reference to FIG. 4F. In this way, a QSFP transceiver module is connected to four SFP transceiver modules using four corresponding independent ROx optical cables directly off the transceiver modules without break-out cables or boxes.

Figure 15:
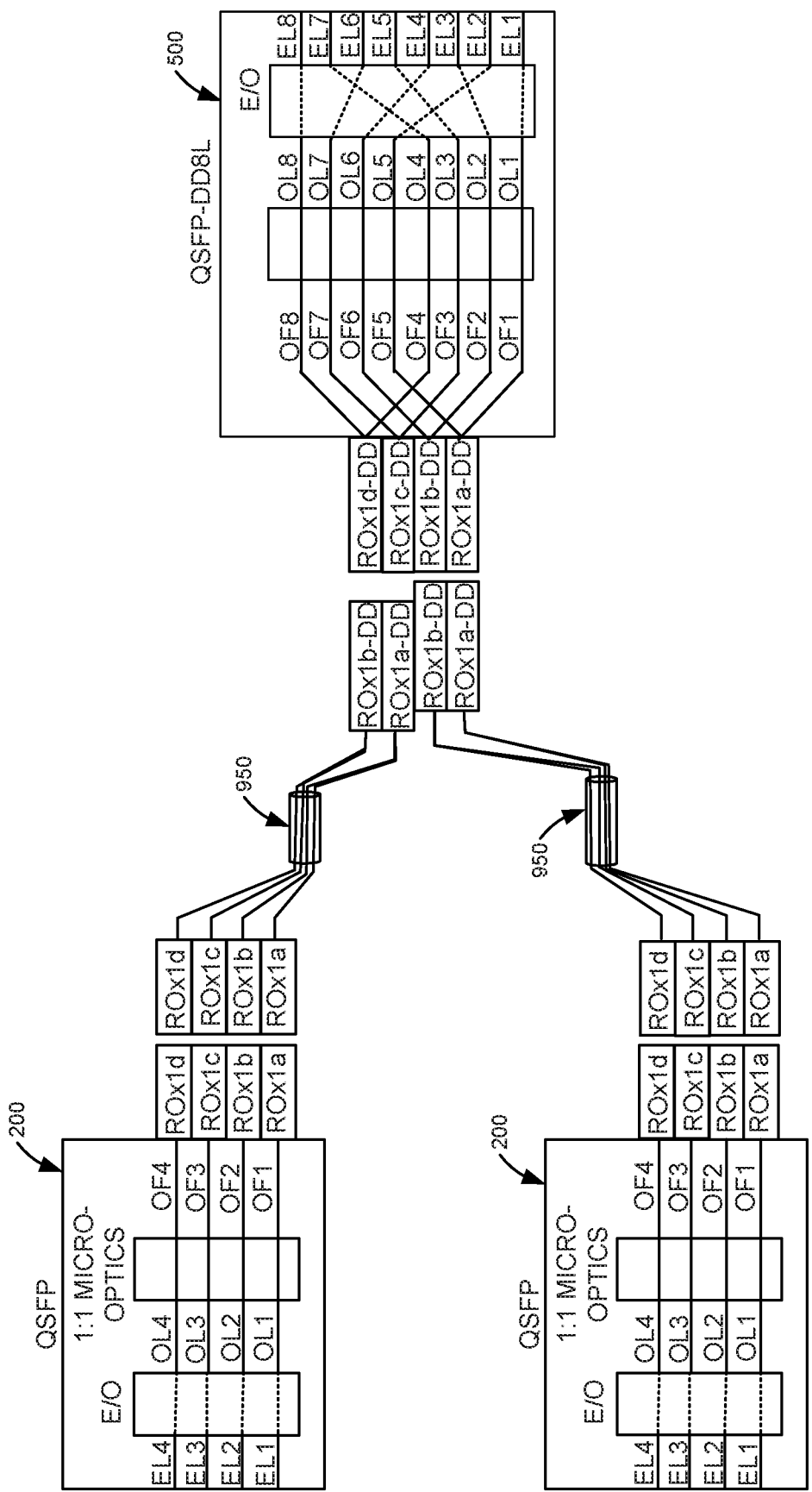
FIG. 15 illustrates one example of a system topology including two QSFP transceiver modules and a QSFP-DD8L transceiver module.

FIG. 15 illustrates one example of a system topology including two QSFP transceiver modules 200 and a QSFP-DD transceiver module 500 in the 8-lane mode (QSFP-DD8L). QSFP transceiver module 200 was previously described and illustrated with reference to FIGS. 3A and 3B. QSFP-DD transceiver module 500 in the 8-lane mode was previously described and illustrated with reference to FIGS. 6C and 6D. As illustrated in FIG. 15, two QSFP transceiver modules 200 may be communicatively coupled to one QSFP-DD transceiver module 500 in the 8-lane mode by using two 4-connector bay 4-lane single-density (ROx4) to 2-connector bay 4-lane double-density (ROx2-DD) optical cables 950, which were previously described and illustrated with reference to FIG. 12. In this way, a QSFP-DD transceiver module is connected to two QSFP transceiver modules using two corresponding independent ROx optical cables directly off the transceiver modules without break-out cables or boxes. In one example, the mode indicator indicates which ROx optical cables should be used with the QSFP-DD transceiver module.

FIG. 16 is a table illustrating one example of an interoperability matrix between transceiver modules/connectors and optical cables. The indicator "*" denotes possible connections to separate transceiver modules. The indicator "^" denotes different lane orders for half of the lanes. The indicator "†" denotes that half of the lanes are used. The number within the indicator "( )" denotes the maximum number of optical cables that may be installed in one of the horizontal or vertical titled transceiver modules. The indicator "/" denotes an ROx1 cable having different ROx optical connectors on each of the two ends of the cable. The indicator "N/A" denotes no interoperability. The blank boxes within the table are defined by other boxes within the table and are thus not repeated for simplicity.

As shown in the table, SFP transceiver modules having a ROx1 connector may be optically coupled to other SFP transceiver modules having a ROx1 connector via (1) ROx1 cables. SFP transceiver modules having a ROx1 connector may be optically coupled to SFP-DD transceiver modules having a ROx2 connector via (2) ROx1* cables. SFP transceiver modules having a ROx1 connector may be optically coupled to SFP-DD transceiver modules having a ROx1-DD connector via (1) ROx1† cables. SFP transceiver modules having a ROx1 connector may be optically coupled to QSFP transceiver modules having a ROx4 connector via (4) ROx1* cables. SFP transceiver modules having a ROx1 connector may be optically coupled to QSFP-DD transceiver modules operating in 8-lane mode (i.e., QSFP-DD8L) having a ROx4-DD connector via (4) ROx1† * cables. SFP transceiver modules having a ROx1 connector may be optically coupled to QSFP-DD transceiver modules operating in 4-lane mode (i.e., QSFP-DD4L) having a ROx4-DD connector via (4) ROx1* cables. SFP transceiver modules having a ROx1 connector may be optically coupled to QSFP-2XO transceiver modules in 4-optical-lane (half-rate) mode and having a ROx4-DD connector via (4) ROx1* cables.

SFP-DD transceiver modules having a ROx2 connector may be optically coupled to SFP-DD transceiver modules having a ROx2 connector via (2) ROx1* or (1) ROx2 cables. SFP-DD transceiver modules having a ROx2 connector may be optically coupled to SFP-DD transceiver modules having a ROx1-DD connector via (1) ROx2/ROx1-DD cables. SFP-DD transceiver modules having a ROx2 connector may be optically coupled to QSFP transceiver modules having a ROx4 connector via (2) ROx2* cables. SFP-DD transceiver modules having a ROx2 connector may be optically coupled to QSFP-DD8L transceiver modules having a ROx4-DD connector via (4) ROx2/ROx1-DD* cables. SFP-DD transceiver modules having a ROx2 connector may be optically coupled to QSFP-DD4L transceiver modules having a ROx4-DD connector via (2) ROx2* cables. SFP-DD transceiver modules having a ROx2 connector may be optically coupled to QSFP-2XO transceiver modules in 4-optical-lane (half-rate) mode and having a ROx4-DD connector via (2) ROx2* cables.

SFP-DD transceiver modules having a ROx1-DD connector may be optically coupled to SFP-DD transceiver modules having a ROx1-DD connector via (1) ROx1-DD cables. SFP-DD transceiver modules having a ROx1-DD connector may be optically coupled to QSFP transceiver modules having a ROx4 connector via (2) ROx1-DD/ROx2* or (4) ROx1† * cables. SFP-DD transceiver modules having a ROx1-DD connector may be optically coupled to QSFP-DD8L transceiver modules having a ROx4-DD connector via (4) ROx1-DD* cables. SFP-DD transceiver modules having a ROx1-DD connector may be optically coupled to QSFP-DD4L transceiver modules having a ROx4-DD connector via (4) ROx1† * or (2) ROx1-DD/ROx2* cables. SFP-DD transceiver modules having a ROx1-DD connector may be optically coupled to QSFP-2XO transceiver modules in 4-optical-lane (half-rate) mode having a ROx4-DD connector via (2) ROx1-DD/ROx2* cables.

QSFP transceiver modules having a ROx4 connector may be optically coupled to QSFP transceiver modules having a ROx4 connector via (1) ROx4, (2) ROx2*, or (4) ROx1* cables. QSFP transceiver modules having a ROx4 connector may be optically coupled to QSFP-DD8L transceiver modules having a ROx4-DD connector via (2) ROx4/ROx2-DD* cables. QSFP transceiver modules having a ROx4 connector may be optically coupled to QSFP-DD4L transceiver modules having a ROx4-DD connector via (1) ROx4, (2) ROx2*, or (4) ROx1* cables. QSFP transceiver modules having a ROx4 connector may be optically coupled to QSFP-2XO transceiver modules in 4-optical-lane (half-rate) mode and having a ROx4-DD connector via (1) ROx4, (2) ROx2*, or (4) ROx1* cables.

QSFP transceiver modules having a ROx1 connector and a CWDM may be optically coupled to QSFP transceiver modules having a ROx1 connector and a CWDM via (1) ROx1 cables. QSFP transceiver modules having a ROx1 connector and a CWDM may be optically coupled to QSFP-DD transceiver modules having a ROx2 connector and a CWDM via (2) ROx1* cables. QSFP transceiver modules having a ROx1 connector and a CWDM may be optically coupled to HLP transceiver modules having three ROx2 connectors via (6) ROx1* cables.

QSFP-DD8L transceiver modules having a ROx4-DD connector may be optically coupled to QSFP-DD8L transceiver modules having a ROx4-DD connector via (1) ROx4-DD, (2) ROx2-DD*, (4) ROx1-DD*, (1) ROx4†, (2) ROx2*†, or (4) ROx1*† cables. QSFP-DD8L transceiver modules having a ROx4-DD connector may be optically coupled to QSFP-DD4L transceiver modules having a ROx4-DD connector via (1) ROx4-DDA, (2) ROx2-DD*^, (4) ROx1-DD*^, (1) ROx4†, (2) ROx2*†, or (4) ROx1*† cables. QSFP-DD8L transceiver modules having a ROx4-DD connector may be optically coupled to QSFP-2XO transceiver modules in 4-optical-lane (half-rate) mode and having a ROx4-DD connector via (2) ROx4/ROx2-DD* cables.

QSFP-DD4L transceiver modules having a ROx4-DD connector may be optically coupled to QSFP-DD4L transceiver modules having a ROx4-DD connector via (1) ROx4, (2) ROx2*, (4) ROx1*, (1) ROx4-DD†, (2) ROx2-DD*†, or (4) ROx1-DD*† cables. QSFP-DD4L transceiver modules having a ROx4-DD connector may be optically coupled to QSFP-2XO transceiver modules in 4-optical-lane (half-rate) mode and having a ROx4-DD connector via (1) ROx4, (2) ROx2*, or (4) ROx1*, (1) ROx4-DD†, (2) ROx2-DD*†, or (4) ROx1-DD*† cables.

QSFP-DD transceiver modules having a ROx2 connector and a CWDM may be optically coupled to QSFP-DD transceiver modules having a ROx2 connector and a CWDM via (1) ROx2 or (2) ROx1* cables. QSFP-DD transceiver modules having a ROx2 connector and a CWDM may be optically coupled to HLP transceiver modules having three ROx2 connectors via (3) ROx2* or (6) ROx1* cables. HLP transceiver modules having three ROx2 connectors may be optically coupled to HLP transceiver modules having three ROx2 connectors via (3) ROx2* or (6) ROx1* cables.

QSFP-2XO transceiver modules in 8-optical-lane (full-rate) mode and having a ROx4-DD connector may be optically coupled to QSFP-2XO transceiver modules in 4-optical-lane (half-rate) mode and having a ROx4-DD connector via (1) ROx4-DD, (2) ROx2-DD*, or (4) ROx1-DD* cables. QSFP-2XO transceiver modules in 4-optical-lane (half-rate) mode and having a ROx4-DD connector may be optically coupled to QSFP-2XO transceiver modules in 4-optical-lane (half-rate) mode and having a ROx4-DD connector via (1) ROx4, (2) ROx2*, (4) ROx1', (1) Rox4-DD†, (2) ROx2-DD*†, or (4) ROx1-DD*† cables. Other transceiver modules not listed in the table of FIG. 16 (e.g., OSFP transceiver modules, CDFP transceivers modules, CFP transceiver modules) may be interoperable with the transceiver modules listed in the table by using the described optical connectors and cables.

The ROx modular optical cable connectors described herein enable the direct connection of optical cables between optical transceiver modules by selecting optical cables with the desired bandwidth without using breakout cables and/or breakout boxes. In addition, with no breakout cables or breakout boxes, connectively solutions costs are lowered, reliability of optical cable links is increased, and connection topologies are easier to identify and maintain.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An optical transceiver module comprising:
a receptacle comprising six receptacle bays, each receptacle bay supporting 1-lane for optical transmit and receive signals,
wherein the receptacle is to connect to any one of a 6-connector bay 6-lane single-density optical cable and a 6-connector bay 12-lane double-density optical cable;
an electro-optical transceiver; and
a management controller to map optical lanes to electrical lanes within the electro-optical transceiver based on whether the optical transceiver module is installed in a quad small form-factor pluggable transceiver cage or a double-density quad small form-factor pluggable transceiver cage.

2. The optical transceiver module of claim 1, further comprising:
a coarse wavelength division multiplexer optically coupled to each receptacle bay to multiplex four optical lanes onto one optical fiber and demultiplex the one optical fiber onto the four optical lanes for each receptacle bay.

3. The optical transceiver module of claim 1, wherein the management controller sets the optical transceiver module to operate in a 4-lane mode with the optical transceiver module installed in a quad small form-factor pluggable transceiver cage, and
wherein the management controller sets the optical transceiver module to operate in an 8-lane mode with the optical transceiver module installed in a double-density quad small form-factor pluggable transceiver cage.

4. An optical transceiver module comprising:
a receptacle comprising four receptacle bays, each receptacle bay supporting 2-lanes for optical transmit and receive signals,
wherein the receptacle is to connect to any one of a 4-connector bay 4-lane single-density optical cable, a 4-connector bay 8-lane double-density optical cable, two 2-connector bay 2-lane single-density optical cables, two 2-connector bay 4-lane double-density optical cables, four 1-connector bay 1-lane single-density optical cables, and four 1-connector bay 2-lane double-density optical cables,
an electro-optical transceiver; and
a management controller to map optical lanes to electrical lanes within the electro-optical transceiver based on whether the optical transceiver module is installed in a quad small form-factor pluggable transceiver cage or a double-density quad small form-factor pluggable transceiver cage.

5. The optical transceiver module of claim 4, wherein the management controller sets the optical transceiver module to operate in a 4-lane mode with the optical transceiver module installed in a quad small form-factor pluggable transceiver cage, and wherein the management controller sets the optical transceiver module to operate in an 8-lane mode with the optical transceiver module installed in a double-density quad small form-factor pluggable transceiver cage.

6. The optical transceiver module of claim 5, further comprising:

a mode indicator indicating whether the optical transceiver module is operating in the 4-lane mode or the 8-lane mode.

7. The optical transceiver module of claim 4, wherein the receptacle is to connect to any one of a 2-connector bay 4-lane double-density to 4-connector bay 4-lane single-density optical cable and a 1-connector bay 2-lane double-density to 2-connector bay 2-lane single-density optical cable.

8. The optical transceiver module of claim 4, further comprising:

a coarse wavelength division multiplexer optically coupled to the at least one receptacle bay to multiplex a plurality of optical lanes onto one optical fiber and demultiplex the one optical fiber onto the plurality of optical lanes.

* * * * *